US012605908B2

(12) United States Patent
Crothers

(10) Patent No.: US 12,605,908 B2
(45) Date of Patent: Apr. 21, 2026

(54) SYSTEMS AND METHODS FOR FORMING COMPOSITE WORKPIECES

(71) Applicant: The Boeing Company, Arlington, VA (US)

(72) Inventor: Phillip J. Crothers, Hampton East (AU)

(73) Assignee: The Boeing Company, Arlington, VA (US)

( * ) Notice: Subject to any disclaimer, the term of this patent is extended or adjusted under 35 U.S.C. 154(b) by 84 days.

(21) Appl. No.: 18/430,919

(22) Filed: Feb. 2, 2024

(65) Prior Publication Data

US 2025/0249645 A1 Aug. 7, 2025

(51) Int. Cl.
B29C 70/44 (2006.01)
B29C 70/56 (2006.01)

(52) U.S. Cl.
CPC .............. B29C 70/44 (2013.01); B29C 70/56 (2013.01)

(58) Field of Classification Search
CPC ..... B29C 70/56; B29C 70/541; B29C 51/265; B29C 31/08
See application file for complete search history.

(56) References Cited

U.S. PATENT DOCUMENTS

| | | | | |
|---|---|---|---|---|
| 4,648,934 | A | * | 3/1987 | Kiss ......................... B27N 5/02 |
| | | | | 425/374 |
| 5,037,599 | A | | 8/1991 | Olson |
| 5,156,795 | A | | 10/1992 | Harvey et al. |

| | | | | |
|---|---|---|---|---|
| 5,578,158 | A | * | 11/1996 | Gutowski ............... B32B 37/10 |
| | | | | 425/389 |
| 5,648,109 | A | | 7/1997 | Gutkowski et al. |
| 10,030,174 | B2 | | 7/2018 | Yoneyama et al. |
| 11,034,099 | B2 | | 6/2021 | Wybrow et al. |
| 11,518,117 | B2 | | 12/2022 | Wybrow et al. |
| 11,534,988 | B2 | | 12/2022 | Wybrow et al. |

(Continued)

FOREIGN PATENT DOCUMENTS

| | | |
|---|---|---|
| EP | 0410599 A2 | 1/1991 |
| EP | 3213907 B1 | 2/2021 |

OTHER PUBLICATIONS

European Patent Office, Extended European Search Report, App. No. 25153085.3 (Jun. 24, 2025).

*Primary Examiner* — Matthew J Daniels
(74) *Attorney, Agent, or Firm* — Walters & Wasylyna LLC

(57) ABSTRACT

A system for forming a composite workpiece includes a housing, a forming tool disposed in the housing, and an actuator disposed in the housing. The system includes a shaping assembly including a lower diaphragm and an upper diaphragm. The system includes a negative pressure source in fluid communication with the housing. The workpiece is disposed between the lower diaphragm and the upper diaphragm of the shaping assembly. The shaping assembly is coupled to the housing over the forming tool such that the housing and the shaping assembly form a sealed vessel around the forming tool. The negative pressure source creates a negative pressure between the housing and the shaping assembly to urge the shaping assembly against the forming tool. The actuator selectively extends or retracts to control a shape of at least a portion of the shaping assembly while the shaping assembly is urged against the forming tool.

20 Claims, 15 Drawing Sheets

(56)             References Cited

U.S. PATENT DOCUMENTS

2009/0091063 A1*  4/2009  Petersson ............... B29C 43/12
                                                425/398
2013/0340944 A1   12/2013  Modin
2020/0198185 A1    6/2020  Hirabayashi et al.
2022/0310407 A1    9/2022  Kim et al.

* cited by examiner

1100

| SPECIFICATION AND DESIGN | 1102 |

| MATERIAL PROCUREMENT | 1104 |

| COMPONENT AND SUBASSEMBLY MFG. | 1106 |

| SYSTEM INTEGRATION | 1108 |

| CERTIFICATION AND DELIVERY | 1110 |

| IN SERVICE | 1112 |

| MAINTENANCE AND SERVICE | 1114 |

SYSTEMS AND METHODS FOR FORMING COMPOSITE WORKPIECES

FIELD

The present disclosure relates generally to composite manufacturing and, more particularly, systems and methods for forming a composite workpiece using diaphragm forming.

BACKGROUND

Fiber-reinforced polymer composite materials have gained widespread use in many industries, such as aerospace, automotive, marine, industrial, construction, and a wide variety of consumer products. Various processes exist for three-dimensional shaping of the composite material into a final molded product. Conventional fabrication techniques for forming composite parts include manual lay-up, die forming, hydroforming, vacuum forming, and diaphragm forming. However, each of these techniques has its own disadvantages, such as being time consuming and being prone to wrinkling and other imperfections. Another drawback of these techniques is that they are limited to the formation of relatively simple shapes. Accordingly, those skilled in the art continue with research and development efforts in forming composite workpieces.

SUMMARY

Disclosed are examples of a system for forming a composite workpiece and a method for forming a composite workpiece. The following is a non-exhaustive list of examples, which may or may not be claimed, of the subject matter according to the present disclosure.

In an example, the disclosed system includes a housing and a forming tool disposed in the housing. The system includes an actuator disposed in the housing. The system includes a shaping assembly including a lower diaphragm and an upper diaphragm. The system includes a negative pressure source in fluid communication with the housing. The workpiece is disposed between the lower diaphragm and the upper diaphragm of the shaping assembly. The shaping assembly is coupled to the housing over the forming tool such that the housing and the shaping assembly form a sealed vessel around the forming tool. The negative pressure source creates a negative pressure between the housing and the shaping assembly to urge the shaping assembly against the forming tool. The actuator selectively extends or retracts to control a shape of at least a portion of the shaping assembly while the shaping assembly is urged against the forming tool.

In another example, the disclosed system includes a housing and a forming tool disposed in the housing. The system includes a plurality of actuators disposed in the housing. The system includes a shaping assembly including a lower diaphragm and an upper diaphragm. The system includes a negative pressure source in fluid communication with the housing. The workpiece is disposed between the lower diaphragm and the upper diaphragm of the shaping assembly. The shaping assembly is coupled to the housing over the forming tool such that the housing and the shaping assembly form a sealed vessel around the forming tool. The negative pressure source creates a negative pressure between the housing and the shaping assembly to urge the shaping assembly against the forming tool. Each one of the actuators selectively extends or retracts to control a shape of at least a portion of the shaping assembly while the shaping assembly is urged against the forming tool.

In an example, the disclosed method includes steps of: (1) forming a shaping assembly including a lower diaphragm, an upper diaphragm, and a workpiece disposed between the lower diaphragm and the upper diaphragm; (2) coupling the shaping assembly is to a housing over a forming tool such that the housing and the shaping assembly form a sealed vessel around the forming tool; (3) creating a negative pressure between the housing and the shaping assembly to urge the shaping assembly against the forming tool; and (4) selectively extending or retracting an actuator, disposed within the housing under the shaping assembly, to control a shape of at least a portion of the shaping assembly while the shaping assembly is urged against the forming tool.

In another example, the disclosed method includes steps of: (1) disposing a workpiece between a lower diaphragm and an upper diaphragm to form a shaping assembly; (2) forming a sealed vessel around a forming tool by the shaping assembly and a housing; (3) urging the shaping assembly against the forming tool; and (4) controlling a shape of at least a portion of the shaping assembly while the shaping assembly is urged against the forming tool.

Also disclosed are examples of a portion of an aircraft manufactured according to the method or utilizing the system.

Further disclosed are examples of a composite workpiece manufactured according to one or more examples of the method or utilizing one or more examples of the system.

Other examples of the system and the method will become apparent from the following detailed description, the accompanying drawings, and the appended claims.

DETAILED DESCRIPTION

Figure 1:
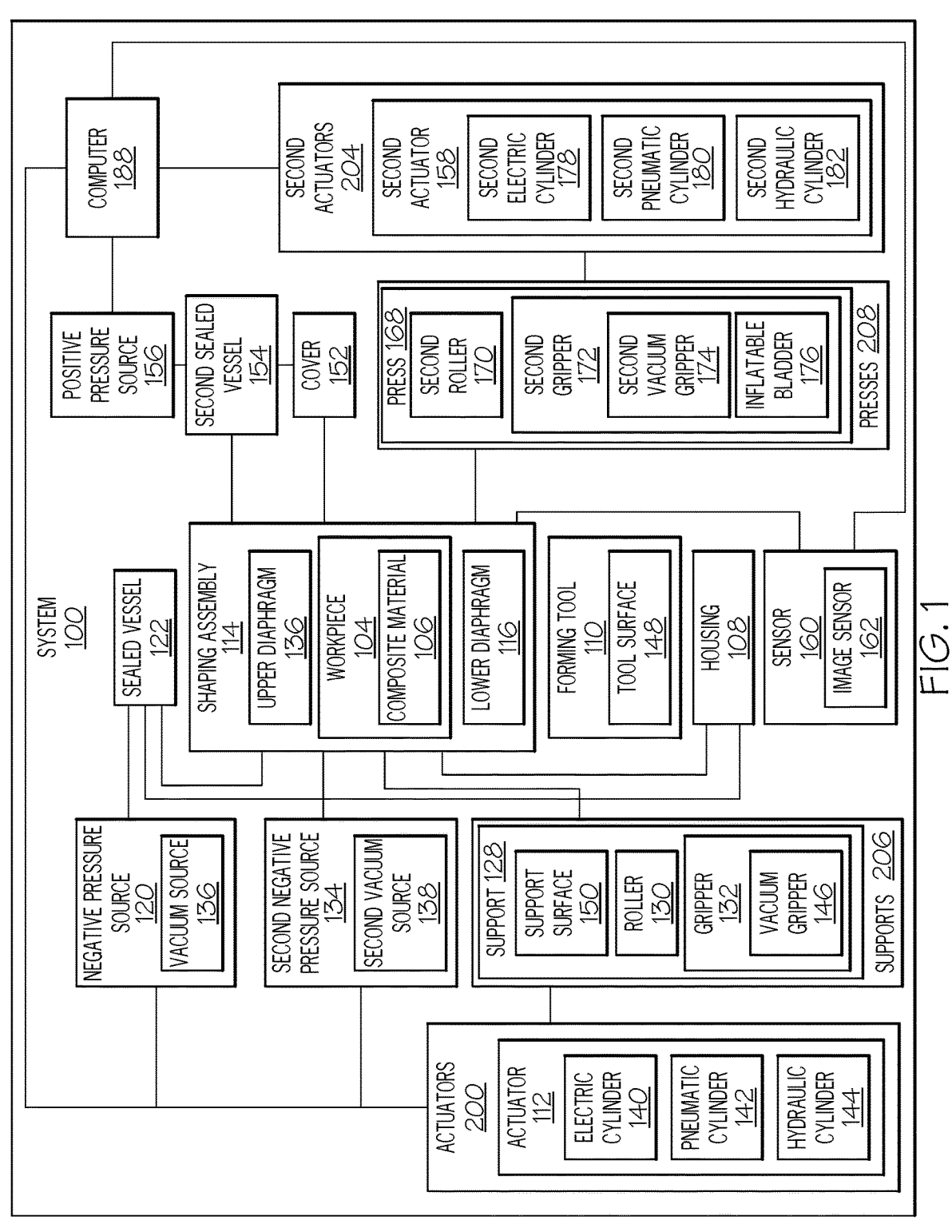
FIG. 1 is a schematic block diagram of an example of system for forming a composite workpiece.

Referring generally to FIGS. 1-13, by way of examples, the present disclosure is directed to a system 100 and a method 1000 for forming a workpiece 104 of a composite material 106 during a composite manufacturing operation. Examples of the system 100 and method 1000 relate to rapid forming of the workpiece 104 that results in a shaped composite article having a compound or complex curvature. In one or more examples, the system 100 and the method 1000 disclosed herein provide a fully automated process for forming thermoplastic or thermosetting composite products. A fully automated process for forming thermoplastic or thermosetting composite products offers improved quality and repeatability, reduced cycle time, and reduced touch time. In particular, examples of the system 100 and the method 1000 disclosed herein utilize controllable actuators to manipulate and control the shape of the workpiece 104 being formed over a forming tool using double diaphragm forming.

Generally, the workpiece 104 includes or takes the form of a thermoformable material that includes reinforcing fibers or filaments, such as a fiber-reinforced polymer composite (e.g., composite material 106). As such, the workpiece 104 may also be referred to as a composite workpiece or a thermoformable workpiece. The workpiece 104 can be made from either pre-impregnated materials or resin-infused materials. Pre-impregnated materials, or "prepregs" are generally formed of reinforcing fibers impregnated with a curable matrix resin, such as thermoplastic resin, thermosetting resin, or epoxy resin. Generally, the term "thermoformable material" is intended to include thermoplastic and thermoset materials, or other suitable heat formable materials having high strength to stiffness ratios that are sufficiently deformable so that the materials can be shaped into a variety of selected shapes. In some examples, the thermoformable material can include a matrix of polymeric resin and reinforcing fibers. In other examples, the thermoformable material can include only reinforcing fibers, only the matrix, partially impregnated fibers, fully impregnated fibers, dry fiber (before inclusion of resin), dry fiber with some matrix to allow for setting the material in shape prior to more resin being added in a subsequent process, fully impregnated fiber composite, or unreinforced plastic. The fibers can include any number of various materials, including glass, carbon, boron, boron nitride, and silicon carbide. Examples of thermoset materials include epoxy, rubber strengthened epoxy and matrix materials. Examples of thermoplastic material include polyarylene sulfide, polyamide, polyimide, polyetherimide, polyesterimide, polyarylene polymer wherein aryl groups are separated by sulfide, sulfone, ether, ketone, and C1-C10 lower alkyl groups, polysulfone, polyethersulfone, polyphenylene sulfide, polyetherimide, polypropylene, polybenzimidazole, polyolefin, polyketone, polyetherketone, polyetherketoneketone (PEKK), polyetheretherketone (PEEK), polyester, polyamide, amorphous polymer, suitable analogs and mixtures thereof.

During forming of the workpiece 104, a number of (i.e., one or more) plies or sheets of the composite material 106 may be cut to size for layup and subsequently assembled and shaped on a forming tool or molding tool. In cases where the workpiece 104 cannot be easily adapted to the shape of the tool, heating may be applied in order to gradually deform it to the shape of the forming surface of the tool. For the purpose of the present disclosure, the term "forming" is intended to mean the shaping, forming, consolidating, or co-consolidating of a workpiece made of one or more layers of a thermoformable material into a final composite product. The final composite product can be either cured or uncured.

The specific construction of composite structures and methods for manufacture thereof and the industry in which the structures and methods are implemented may vary. By way of example, the disclosure describes thermoplastic or thermosetting composite structures and methods for manufacturing at least a portion of an aircraft. The composite structures and methods for manufacture thereof may be implemented by an original equipment manufacturer (OEM) in compliance with commercial, military, and space regulations. It is conceivable that the disclosed composite structures and methods for manufacture thereof may be implemented in many other composite manufacturing industries.

Figure 2:
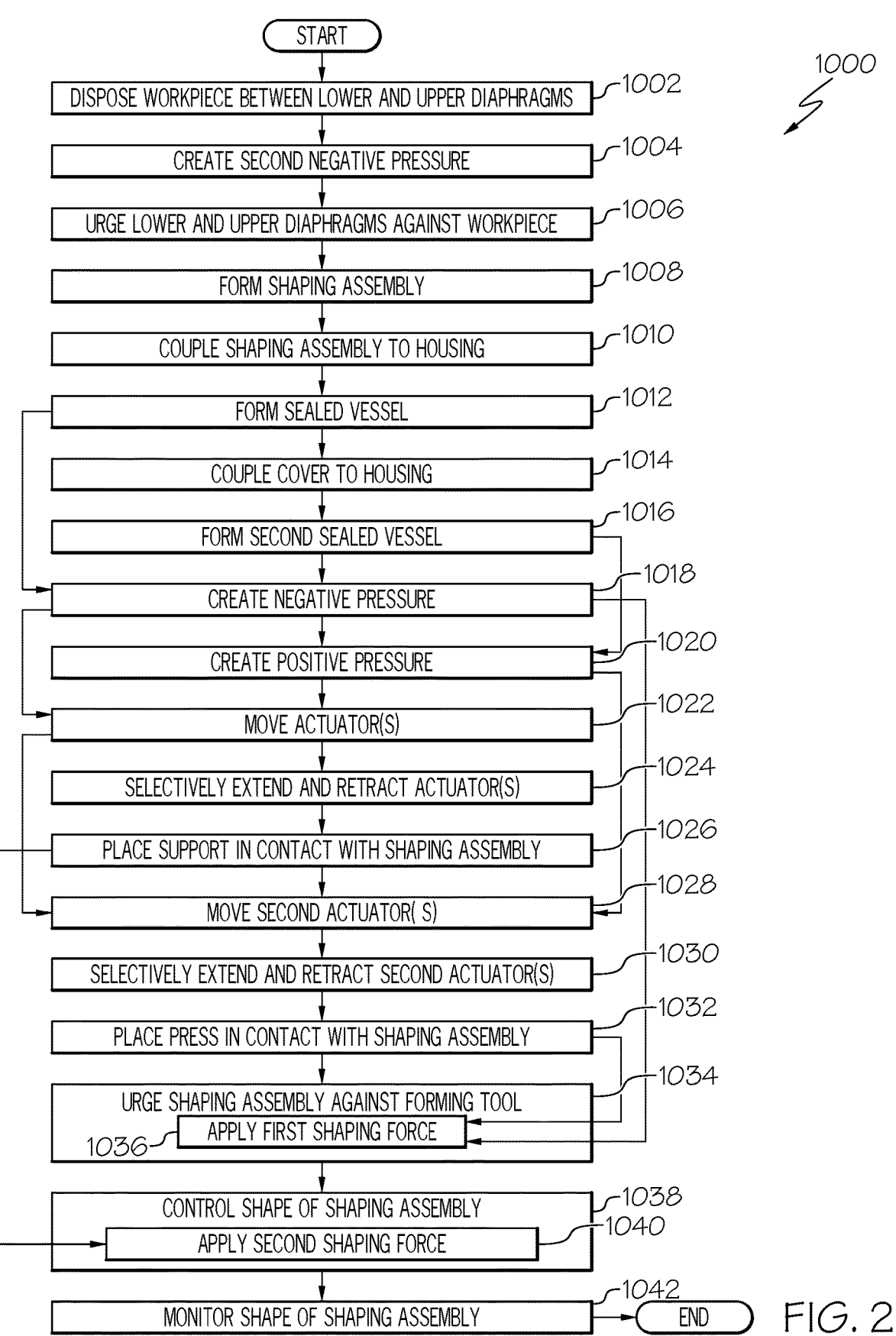
FIG. 2 is a flow diagram of an example of a method for forming a composite workpiece.
Figure 3:
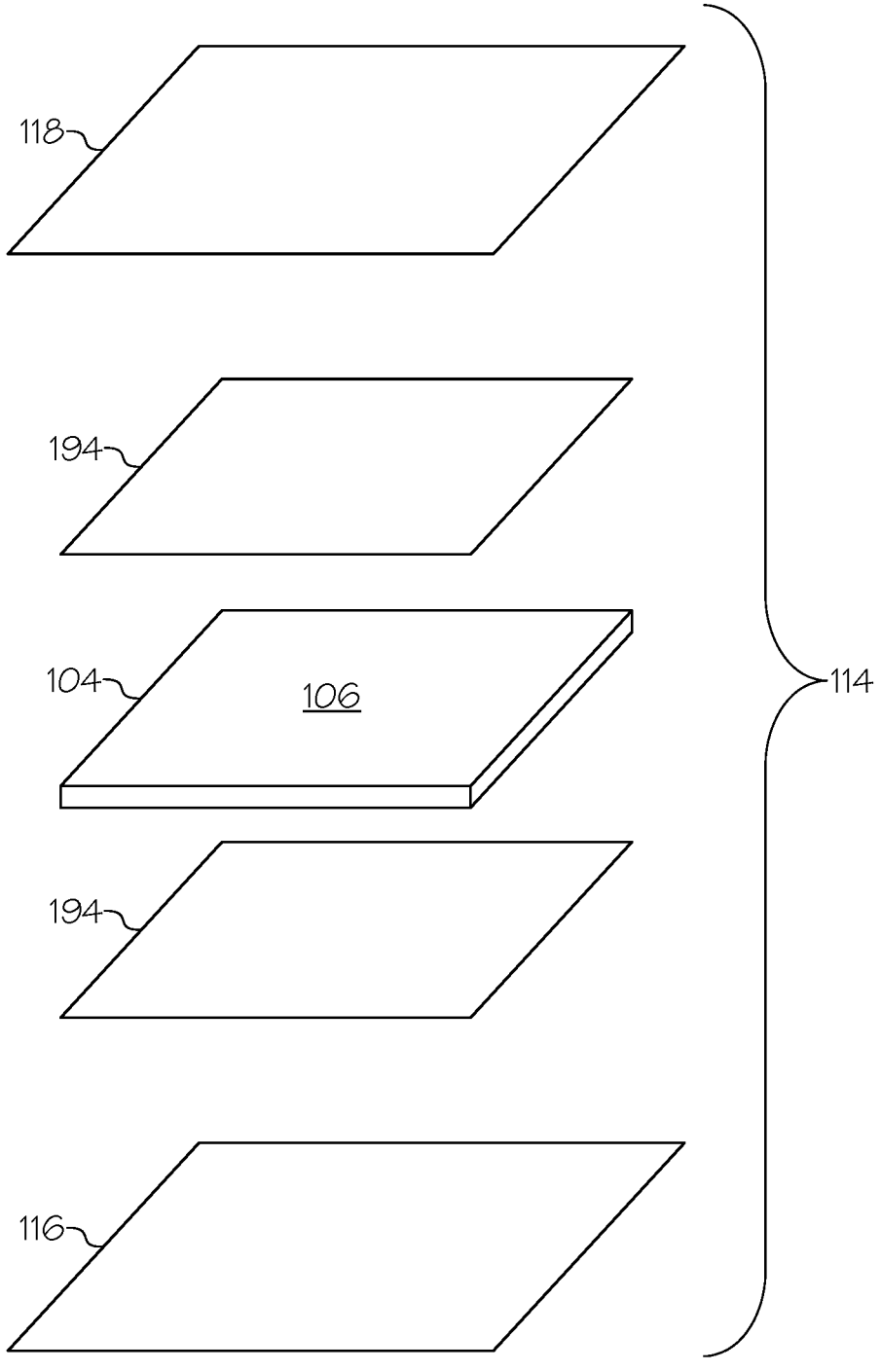
FIG. 3 is a schematic, exploded, perspective view of an example of a shaping assembly of the system.

FIG. 1 illustrates an example of the system 100 for forming the workpiece 104 of the composite material 106. FIG. 2 illustrates an example of the method 1000 for forming the workpiece 104 of the composite material 106. FIG. 3 illustrates an example of a shaping assembly 114 used by the system 100 to form the workpiece 104. FIGS. 4-14 illustrate various examples of the system 100.

Figure 4:
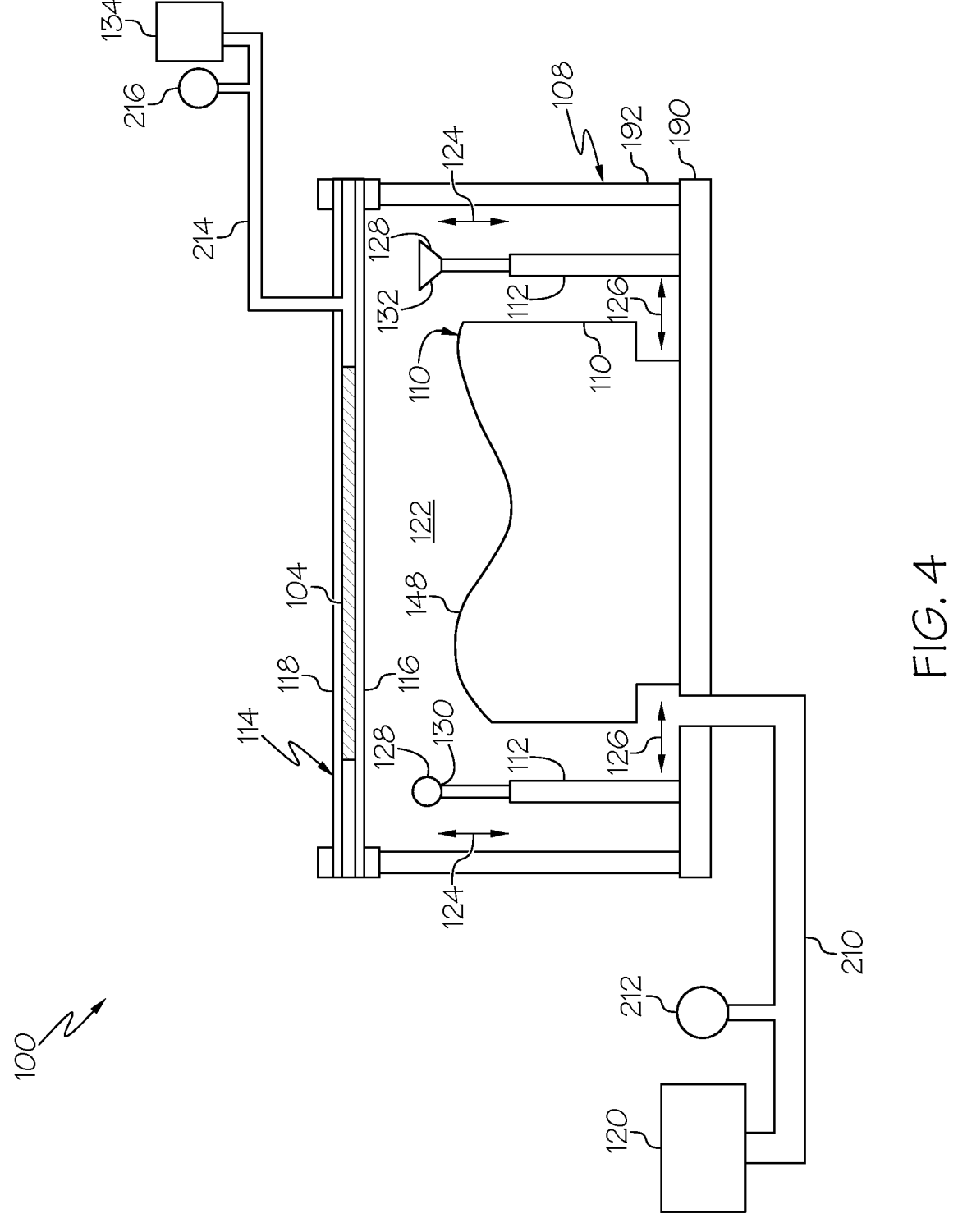
FIG. 4 is a schematic illustration of an example of the system.

Referring generally to FIGS. 1 and 4, in one or more examples, the system 100 and the method 1000 utilize various components and elements that are common to double diaphragm forming systems. In one or more examples, the system 100 includes a housing 108. The housing 108 includes a floor 190 and a wall 192. The floor 190 and the wall 192 of the housing 108 are joined or otherwise coupled together to form a pressure-tight seal. A forming tool 110 is positioned in the housing 108, such as on the floor 190 and surrounded by the wall 192. The forming tool 110 has an outer, tool surface 148 (or forming surface) that is configured to impart a selected shape to the workpiece 104 placed in forcible contact with the tool surface 148. The tool surface 148 of the forming tool 110 can have any desired shape. The housing 108 is in fluid and pressure communication with a negative pressure source 120. The negative pressure source 120 creates a negative pressure within a lower portion of the housing 108, for example, characterized as an internal portion of the housing 108 located beneath the shaping assembly 114. The negative pressure forces (e.g., pulls or urges) the shaping assembly 114 into contact with the tool surface 148 of the forming tool 110 to shape the workpiece 104.

Referring generally to FIG. 1 and particularly to FIG. 3, in one or more examples, the shaping assembly 114 includes the workpiece 104, a lower diaphragm 116, and an upper diaphragm 118. The workpiece 104 can be formed of a plurality of plies or prepregs of a thermoformable material. The workpiece 104 is disposed or positioned between the lower diaphragm 116 and the upper diaphragm 118. The diaphragms 116 and 118 provide mechanical support to the workpiece 104 during the diaphragm forming process to decrease the occurrence of undesirable deformations. The diaphragms 116 and 118 can be made of any high strength, elastic material, such as rubber, silicone rubber, and even ductile metals. The diaphragm forming process may be a desirable fabrication technique because the process helps maintain biaxial tension on the workpiece 104, as well as a compressive normal force on the workpiece 104, throughout the forming process. In one or more examples, the diaphragms 116 and 118 can be coated with a suitable non-stick or releasing coating, such as silicone or TEFLON™, which facilitates relatively easy separation of the diaphragms 116 and 118 from the workpiece 104. In one or more examples, the shaping assembly 114 includes a release film (e.g., liner 194) disposed between the workpiece 104 and one or both of the diaphragms 116 and 118. In some examples, the shaping assembly 114 includes a breather and a release film (e.g., liner 194). The breather material is disposed between the release film and one or both of the diaphragms 116 and 118 such that there is no contact with the workpiece 104 to allow for improved airflow over the workpiece 104 and uniform pressure. In these examples, the breather may add stiffening to the diaphragms 116 and 118, locally, or the diaphragms 116 and 118 may have varying local stiffnesses, if desired to aid the forming process.

In one or more examples, the liner 194 is disposed on one or both sides of the workpiece 104. In one or more examples, a layer of the liner 194 contacts the top and the bottom of the workpiece 104. The liner 194 can further reduce the occurrence of undesirable deformations (e.g., wrinkling) in the workpiece 104 during the shaping and forming process. The liner 194 can include any material that provides mechanical support to the workpiece 104 while being sufficiently deformable to allow the constituents of the shaping assembly 114 to conform to the shape of the forming tool 110. Examples of the material that can be used for the liner 194 include metals (e.g., stainless steel, and lanced and stretched steel); high strength, heat resistant and chemically inert polymeric materials; textiles; and composites. In one or more examples, the liner 194 can be coated with a suitable non-stick or releasing coating, such as silicone or TEF-LON™, to facilitate easy separation from the diaphragms 116, 118 and the workpiece 104 following forming.

The present disclosure recognizes that conventional diaphragm forming techniques are generally limited in the complexity of the forming shapes that can be achieved as a composite workpiece is pulled down by negative pressure or pushed down by positive pressure over a forming tool. Further, even simple forming shapes can result in undesirable deformations, such as wrinkling. The present disclosure also recognizes that undesirable deformations normally occur when high compressive stresses in a workpiece, generated during the forming process, cause a violation in the uniform fiber spacing or compression in line with the fiber within the composite material. This violation causes the fibers to buckle out of plane, which can compromise the structural integrity or visual appearance of the final product. Examples of the system 100 and the method 1000 address the need for improved manufacturing techniques that can form composite parts having relatively complex shapes while reducing the occurrence of wrinkling, improving cycle time, and/or reducing cost.

Referring to FIGS. 1 and 2, generally, the system 100 and the method 1000 enable forming of the workpiece 104, including composite and/or thermoformable (e.g., thermoplastic or thermoset) materials, using a plurality of actuators 200 and/or second actuators 204, which are selectively controllable and integrated in a double diaphragm forming system. The actuators 200 are disposed near the forming tool 110 within a sealed vessel 122 (e.g., forming chamber) defined between the housing 108 and the shaping assembly 114. The actuators 200 are disposed near the forming tool 110 below the shaping assembly 114. In some examples, the second actuators 204 are disposed above the shaping assembly 114. Selective actuation (e.g., translation) of the actuators 200 and/or the second actuators 204 engage the shaping assembly 114 to control the position of the shaping assembly 114 while the assembly 114 is being urged into forcible contact with the tool surface 148 of the forming tool 110. Further, in one or more examples, selective actuation (e.g., translation) of the second actuators 204 is used to press the shaping assembly 114 into forcible contact with the tool surface 148 of the forming tool 110 from above. Controlling the position of the shaping assembly 114 reduces or eliminates the formation of undesirable deformations that can normally occur during a conventional diaphragm forming process.

Through the use of the actuators 200 and/or the second actuators 204, which are independently controlled and automated and which can be positioned above or below the shaping assembly 114 containing the workpiece 104 to be formed, the shaping assembly 114 can be manipulated to far greater complexity of forms and/or sequences of forming. This will enable far greater flexibility in the strategies and processes that are enacted to form composite materials without wrinkles, to evermore increasing complexity of shapes.

Referring now to FIGS. 1 and 3-13, the following are examples of the system 100 for forming the workpiece 104, according to the present disclosure. The system 100 includes a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Referring to FIG. 1, as will be described in more detail herein, in various examples, the system 100 includes a number of operational components, including one or more of the housing 108, the forming tool 110, an actuator 112 or the plurality of actuators 200, the shaping assembly 114, the negative pressure source 120, a second negative pressure source 134, a cover 152, a positive pressure source 156, a second actuator 158 or the plurality of second actuators 204, and a sensor 160.

Referring to FIGS. 1 and 4-7, in one or more examples, the system 100 includes the housing 108. The system 100 includes the forming tool 110 that is disposed in the housing 108. The system 100 includes the actuator 112 that is disposed in the housing 108. The system 100 includes the shaping assembly 114. The shaping assembly 114 includes the lower diaphragm 116 and the upper diaphragm 118. The workpiece 104 is disposed between the lower diaphragm 116 and the upper diaphragm 118 of the shaping assembly 114. The system 100 includes the negative pressure source 120 that is in fluid and pressure communication with the housing 108.

Referring to FIGS. 1 and 4-7, in one or more examples, the shaping assembly 114 is coupled to the housing 108 over the forming tool 110 such that the housing 108 and the shaping assembly 114 form the sealed vessel 122 (e.g., a forming chamber) around the forming tool 110. The assembly 114 can be coupled or otherwise secured to an upper portion of the housing 108 by any suitable mechanism or technique. As examples, the system 100 can include support rings, clamps, fasteners, and the like. Generally, the shaping assembly 114 and the housing 108 are coupled together to form a pressure-tight seal.

Referring to FIGS. 1 and 4-7, in one or more examples, the negative pressure source 120 creates a negative pressure between the housing 108 and the shaping assembly 114 to urge the shaping assembly 114 against the forming tool 110. The actuator 112 selectively extends or retracts to control a shape of at least a portion of the shaping assembly 114 while the shaping assembly 114 is urged against the forming tool 110.

In one or more examples, the housing 108, such as the floor 190, includes an aperture that is in fluid and pressure communication with the negative pressure source 120 via a first conduit 210 (e.g., a vacuum conduit). In one or more examples, the system 100 also includes a first pressure gauge 212 in communication with the first conduit 210. The first pressure gauge 212 monitors the pressure in the first conduit 210 and, thus, within the sealed vessel 122. The negative pressure created between the housing 108 and the shaping assembly 114 forcibly contacts (e.g., pulls) the shaping assembly 114 against the forming tool 110.

Figure 5:
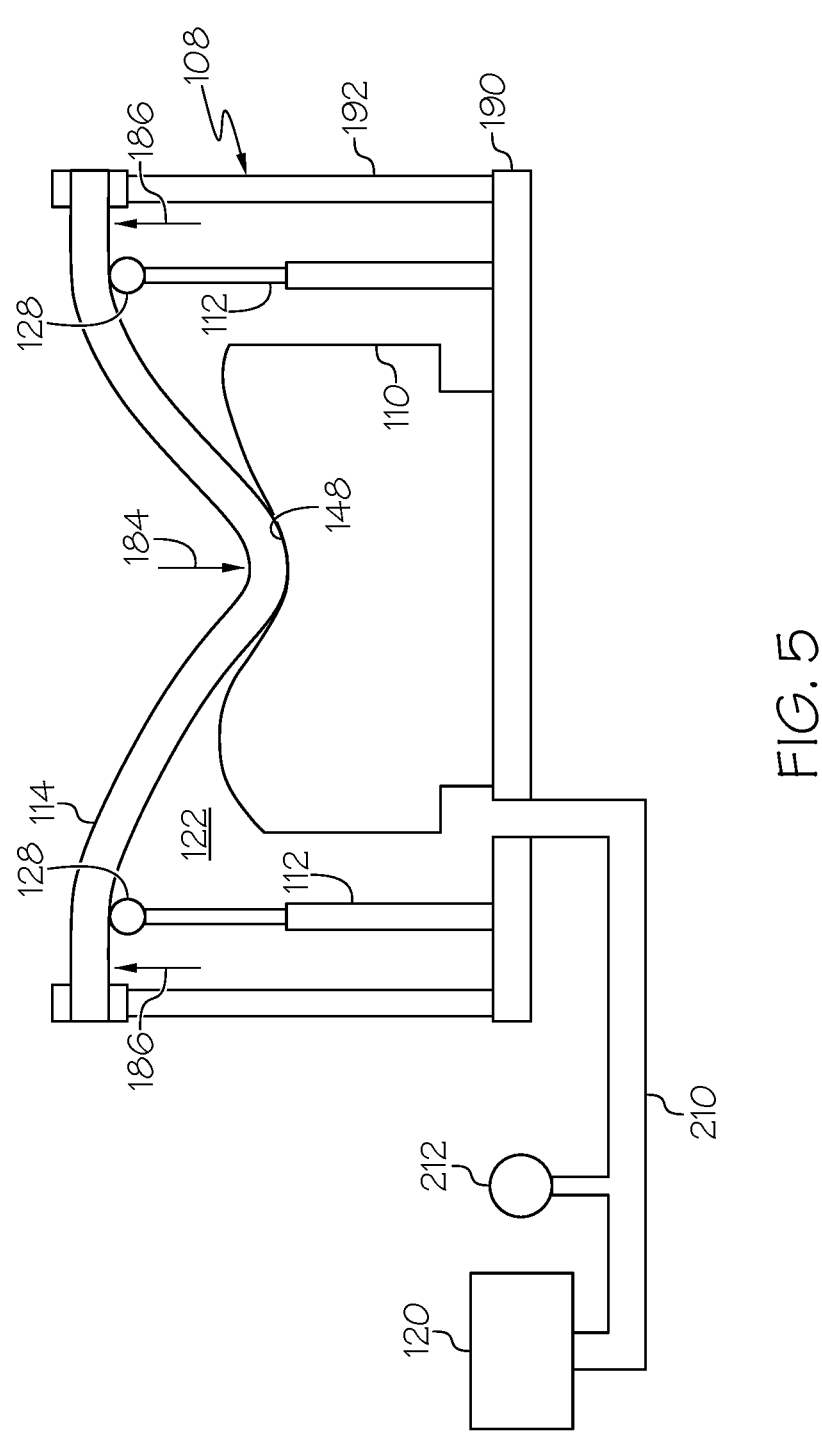
FIG. 5 is a schematic illustration of an example of the system shown in FIG. 4 during a shaping operation.
Figure 6:
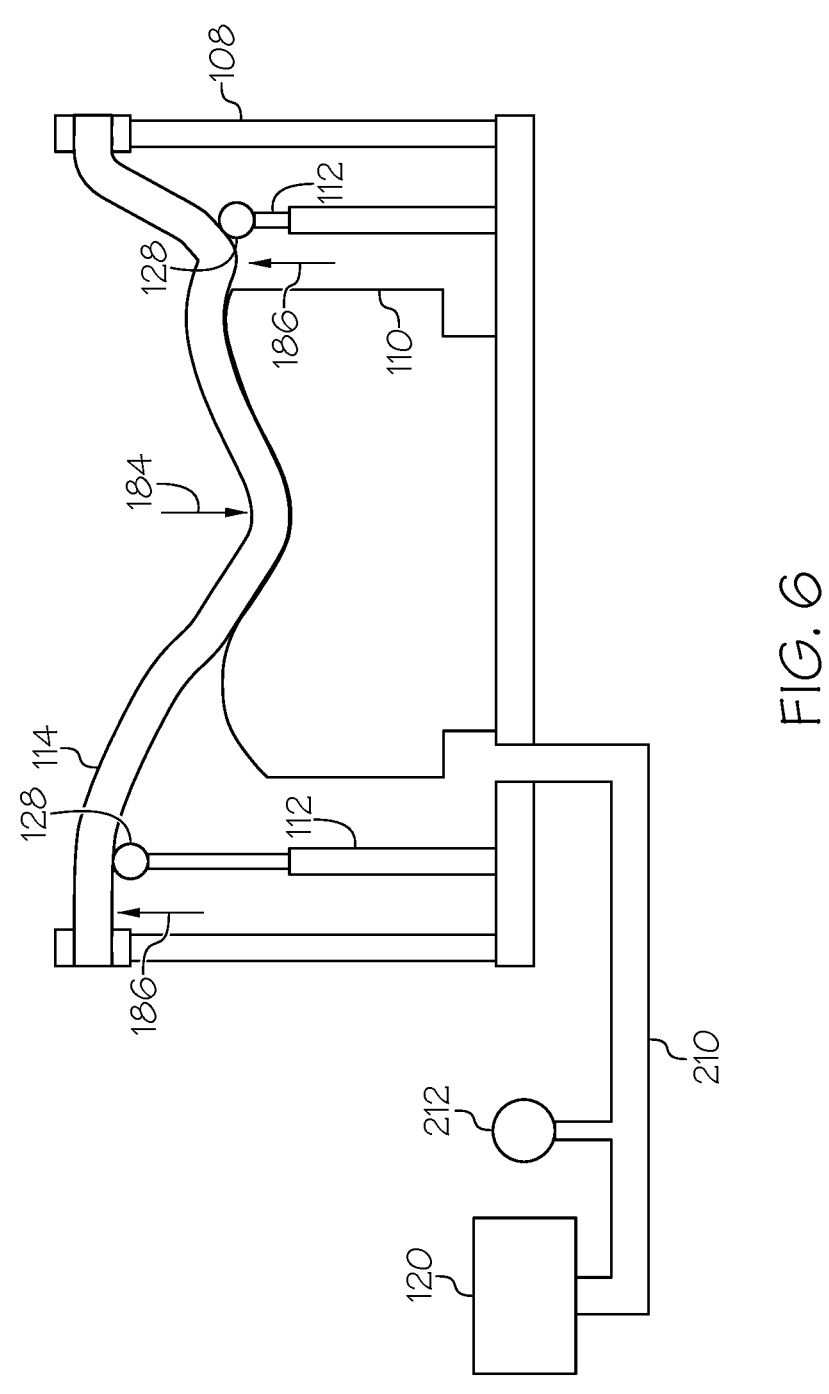
FIG. 6 is a schematic illustration of an example of the system shown in FIG. 4 during the shaping operation.
Figure 6:
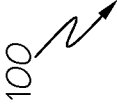
Figure 7:
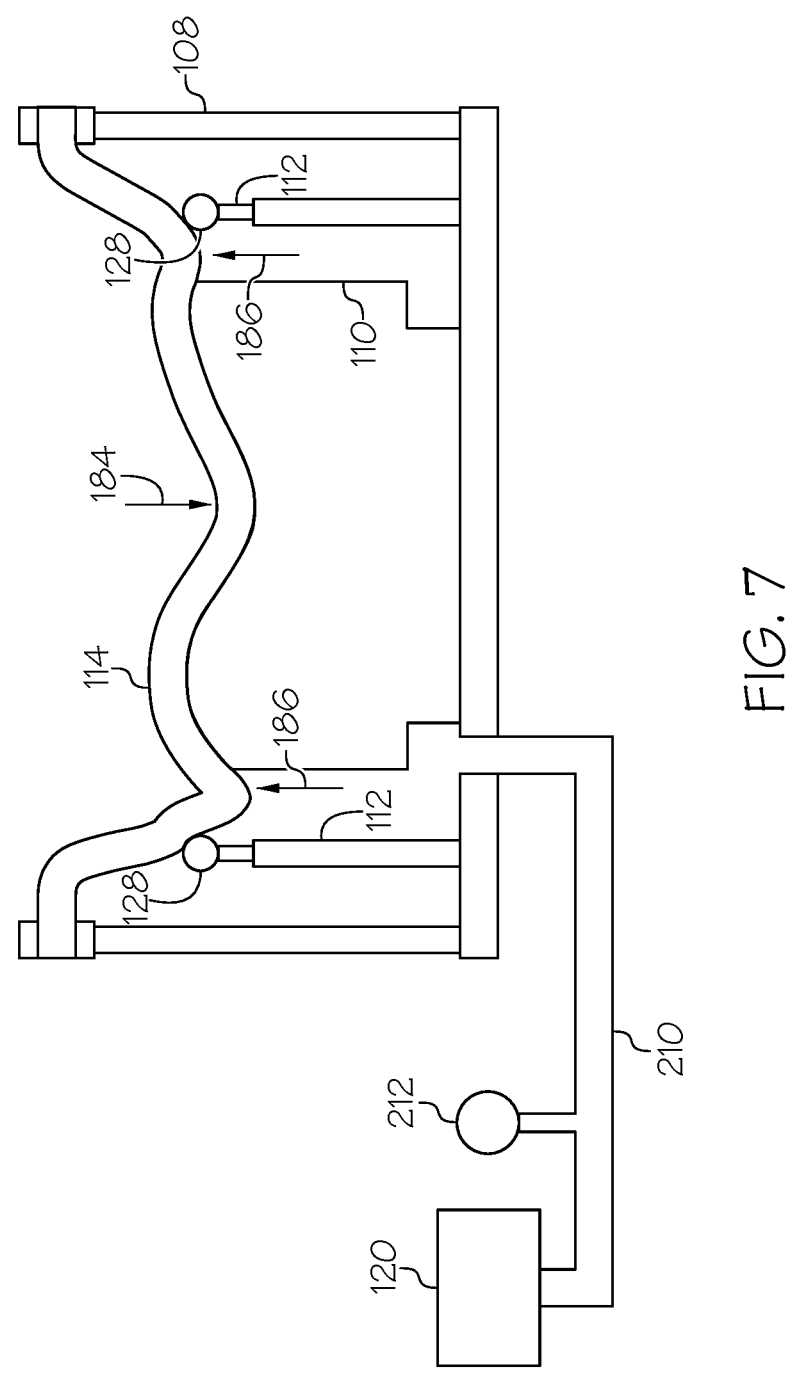
FIG. 7 is a schematic illustration of an example of the system shown in FIG. 4 during a shaping operation.

Referring to FIGS. 4-13, in one or more examples, the actuator 112 extends or retracts as the shaping assembly 114 is forced into contact against the forming tool 110 to control the position of at least a portion of the shaping assembly 114. For example, the actuator 112 translates (e.g., vertically as illustrated in FIGS. 4-13) as the shaping assembly 114 is pulled against the forming tool 110 by the negative pressure to control the position of at least a portion of the shaping assembly 114. In one or more examples, as illustrated in FIG. 5, extension places an end of the actuator 112 in contact with a surface (e.g., bottom surface) of the shaping assembly 114. As illustrated in FIGS. 5-7, extension and/or retraction then maintains the end of the actuator 112 in contact with the surface of the shaping assembly 114 as the shaping assembly 114 is urged toward and/or against the tool surface 148 of the forming tool 110. As such, in one or more examples, extension and/or retraction of the actuator 112 acts against the direction of movement of the portion of the shaping assembly 114 toward the forming tool 110 and controls the out-of-plane position of the portion of the shaping assembly 114 relative to at least another portion of the shaping assembly 114. For the purpose of the present disclosure, "out-of-plane" position of the shaping assembly 114 refers to a position or a direction of movement of at least a portion of the shaping assembly 114 in or along a direction that is not parallel to a virtual plane that contains at least that portion of the shaping assembly 114. "Out-of-plane" can also refer to an orientation that is non-parallel to the fiber or weave direction of the reinforcement of the composite material 106 of the workpiece 104.

Referring to FIG. 1, in one or more examples, the negative pressure source 120 includes a vacuum source 136. In one or more examples, the vacuum source 136 includes or takes the form of a vacuum pump. In these examples, the vacuum source 136 evacuates or removes air from the lower portion of the housing 108, characterized as the sealed vessel 122 located between the housing 108 and the shaping assembly 114. The vacuum source 136 includes any suitable negative pressure pump or reversible pump capable of removing air from the housing 108.

Referring to FIGS. 1 and 4, in one or more examples, the system 100 includes the second negative pressure source 134 that is in fluid communication with the shaping assembly 114. The second negative pressure source 134 creates a second negative pressure between the lower diaphragm 116 and the upper diaphragm 118 to urge the lower diaphragm 116 and the upper diaphragm 118 together around the workpiece 104.

Referring to FIG. 4, in one or more examples, an aperture is located in the shaping assembly 114, such in one of the diaphragms 116 or 118 or between the diaphragms 116 and 118, which is in fluid and pressure communication with the second negative pressure source 134 via a second conduit 214 (e.g., a vacuum conduit). In one or more examples, the system 100 also includes a second pressure gauge 216 in communication with the second conduit 214. The second pressure gauge 216 monitors the pressure in the second conduit 214 and, thus, within the shaping assembly 114 (e.g., between the lower diaphragm 116 and the upper diaphragm 118). The negative pressure created between the lower diaphragm 116 and the upper diaphragm 118 forcibly contacts the lower diaphragm 116 and the upper diaphragm 118 against the top and bottom surface of the workpiece 104.

Referring to FIG. 1, in one or more examples, the second negative pressure source 134 includes a second vacuum source 138. In one or more examples, the second vacuum source 138 includes or takes the form of a vacuum pump. In these examples, the second vacuum source 138 evacuates or removes air from within the shaping assembly 114, for example, between the lower diaphragm 116 and the upper diaphragm 118. The second vacuum source 138 includes any suitable negative pressure pump or reversible pump capable of removing air from the shaping assembly 114. The second negative pressure source 134, the second conduit 214, and the second pressure gauge 216 are not explicitly illustrated in FIGS. 5-7 for the purpose of simplifying the illustrated examples. Additionally, the components of the shaping assembly 114, namely, the lower diaphragm 116, the upper diaphragm 118, and the workpiece 104 are not explicitly illustrated in FIGS. 5-7 for the purpose of simplifying the illustrated examples.

Referring generally to FIG. 1 and particularly to FIG. 4, in one or more examples, the actuator 112 is movable relative to the housing 108 and the shaping assembly 114. In one or more examples, the actuator 112 selectively extends or retracts in a first direction 124. In one or more examples, the first direction 124 is at least approximately parallel to the out-of-plane direction of the shaping assembly 114. In the illustrated example, the first direction 124 in the vertical direction. Hence, selective extension and retraction of the actuator 112 moves and positions the end of the actuator 112 in the first direction 124 to oppose movement of at least a portion of the shaping assembly 114 toward the forming tool 110 in response to the negative pressure and controls the out-of-plane position of at least a portion of the shaping assembly 114 during the diaphragm forming process.

Referring generally to FIG. 1 and particularly to FIG. 4, in one or more examples, the actuator 112 is movable in a second direction 126, which is at least approximately perpendicular to the first direction 124. In one or more examples, the second direction 126 is at least approximately parallel to the in-plane direction of the shaping assembly 114. In the illustrated example, the second direction 126 in the horizontal direction. Hence, selective movement of the actuator 112 in the second direction 126 positions the actuator 112 relative to the different portions of the shaping assembly 114 and relative to any other one of the plurality of actuators 200. For the purpose of the present disclosure, the "in-plane" position, direction, etc. of the shaping assembly 114 refers to a position or a direction of movement of at least a portion of the shaping assembly 114 in or along a direction that is at least approximately parallel to a virtual plane that contains at least that portion of the shaping assembly 114. "In-plane" can also refer to an orientation that is at least approximately parallel to the fiber or weave direction of the reinforcement of the composite material 106 of the workpiece 104.

Referring to FIG. 1, in one or more examples, the actuator 112 includes one of an electric cylinder 140, a pneumatic cylinder 142, or a hydraulic cylinder 144. In these examples, the stroke, the position, and/or the force of the actuator 112 can be controlled by a programmable controller, such as the computer 188.

Referring to FIGS. 1 and 4-7, in one or more examples, the system 100 includes a support 128 that is coupled to the end of the actuator 112. Hence, selective extension and retraction of the actuator 112 places the support 128 in contact with the shaping assembly 114. Further selective extension and/or retraction of the actuator 112 maintains the support 128 in contact with the shaping assembly 114 during the diaphragm forming process.

Figure 10:
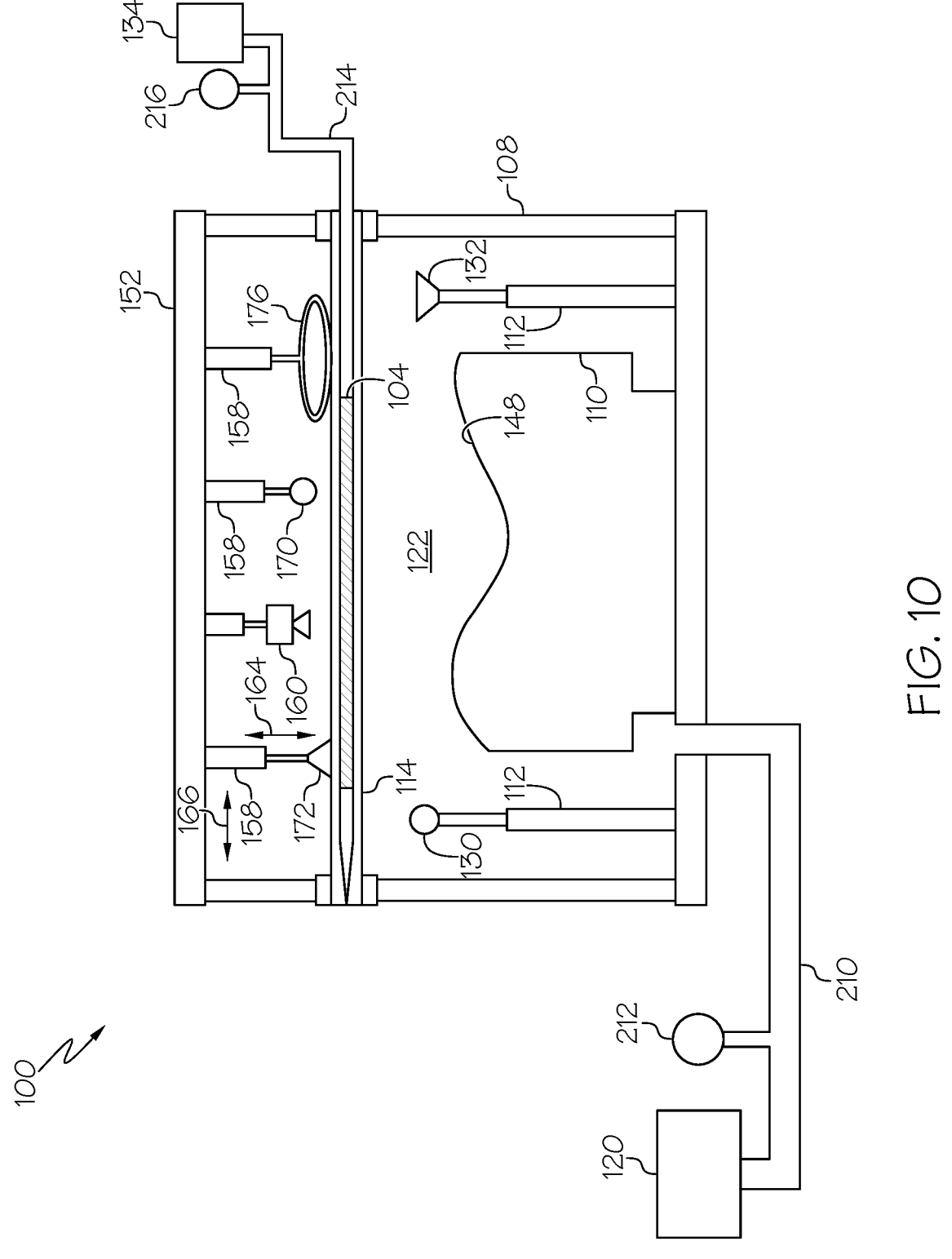
FIG. 10 is a schematic illustration of an example of the system.

Referring generally to FIG. 1 and particularly to FIGS. 4 and 10, in one or more examples, the support 128 includes a roller 130. Use of the roller 130 as the support 128 enables selective control of a portion of the shaping assembly 114 in the out-of-plane direction while permitting free movement of the portion of the shaping assembly 114 in the in-plane direction relative to the roller 130. Generally, the roller 130 is free to rotate about at least one rotational axis that is generally perpendicular to the first direction 124 of movement of the actuator 112. Examples of the roller 130 include a cylindrical roller, a ball bearing, and the like.

Referring generally to FIG. 1 and particularly to FIGS. 4 and 10, in one or more examples, the support 128 includes a gripper 132. Use of the gripper 132 as the support 128 enables selective control of a portion of the shaping assembly 114 in the out-of-plane direction and the in-plane direction by restricting movement of the portion of the shaping assembly 114 in the in-plane direction relative to the gripper 132. In one or more examples, the gripper 132 includes a vacuum gripper 146. Other types of grippers, such as mechanical grippers, electrostatic grippers, and the like are also contemplated.

Referring to FIGS. 1 and 11-13, in one or more examples, the actuator 112 is integrated into the forming tool 110. In one or more of these examples, the support 128 is coupled to the actuator 112. Hence, use of examples of the support 128 that is integrated into the forming tool 110 enables selective control of a portion of the shaping assembly 114 directly over a corresponding portion of the tool surface 148 of the forming tool 110.

Figure 11:
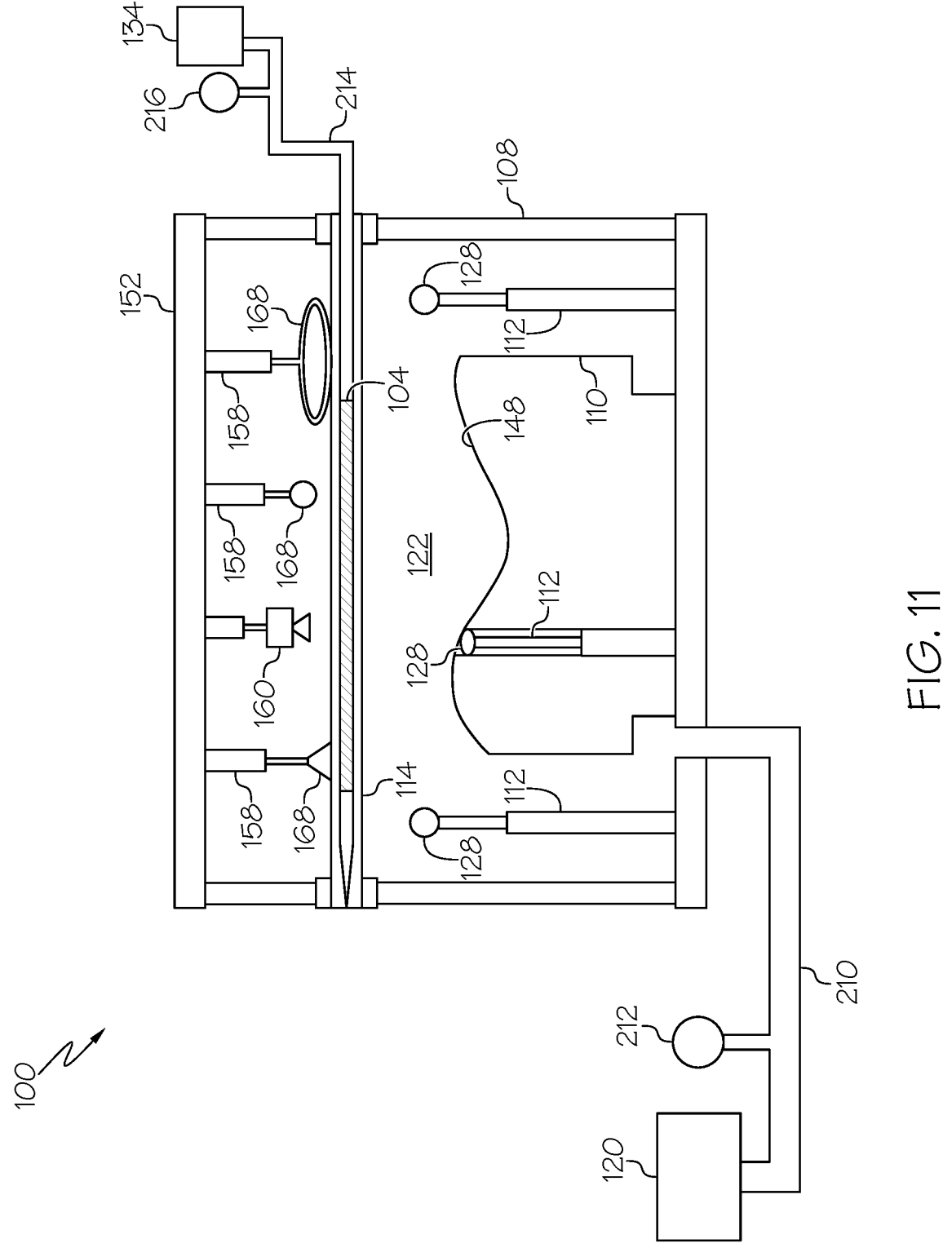
FIG. 11 is a schematic illustration of an example of the system.

Referring to FIGS. 1 and 11, in one or more examples, the support 128 that is coupled to the actuator 112 that is integrated into the forming tool 110 includes or takes the form of the roller 130 or the gripper 132. In other examples, the support 128 that is coupled to the actuator 112 that is integrated into the forming tool 110 includes or takes the form a support structure that is more complementary to the forming tool 110.

Figure 12:
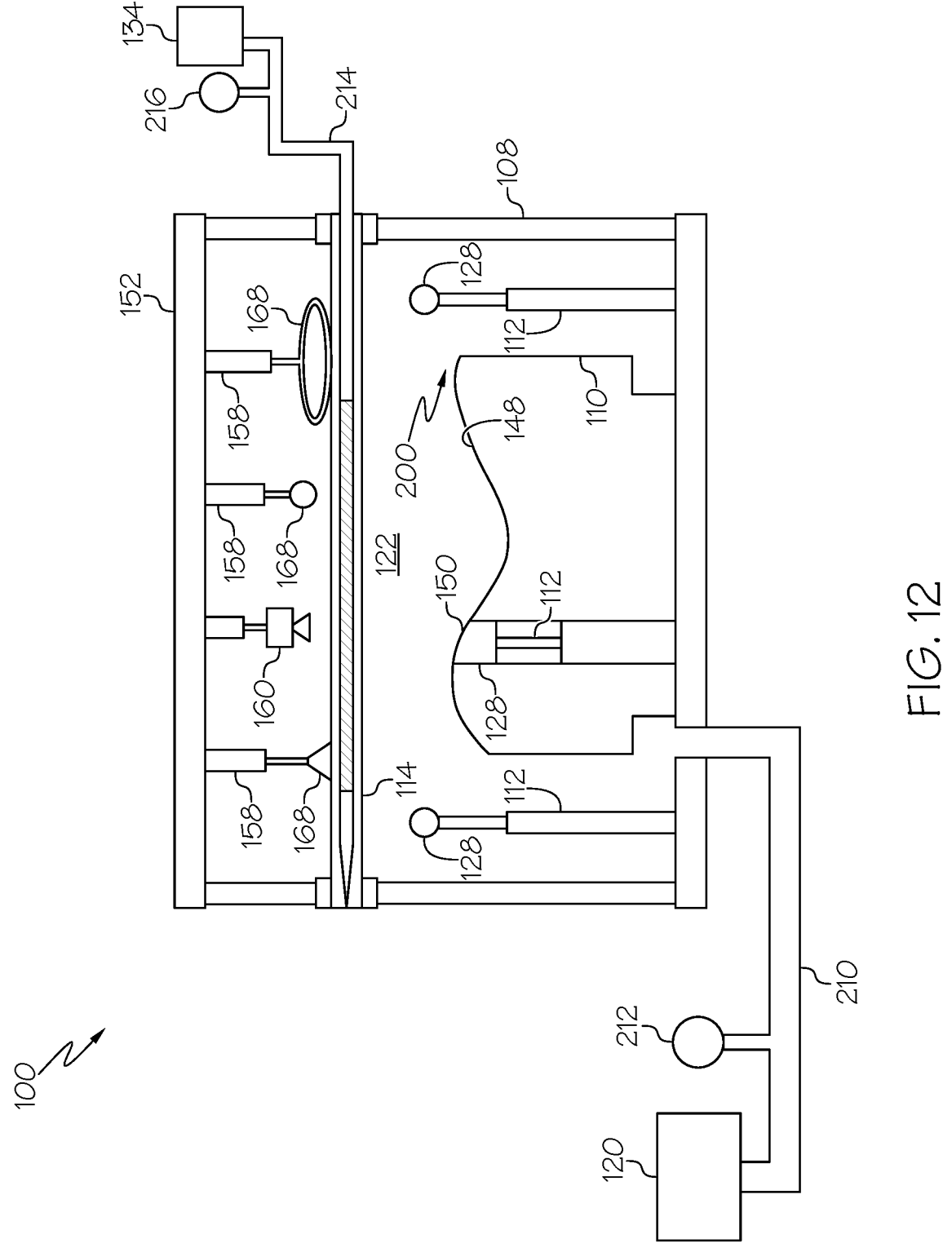
FIG. 12 is a schematic illustration of an example of the system.
Figure 13:
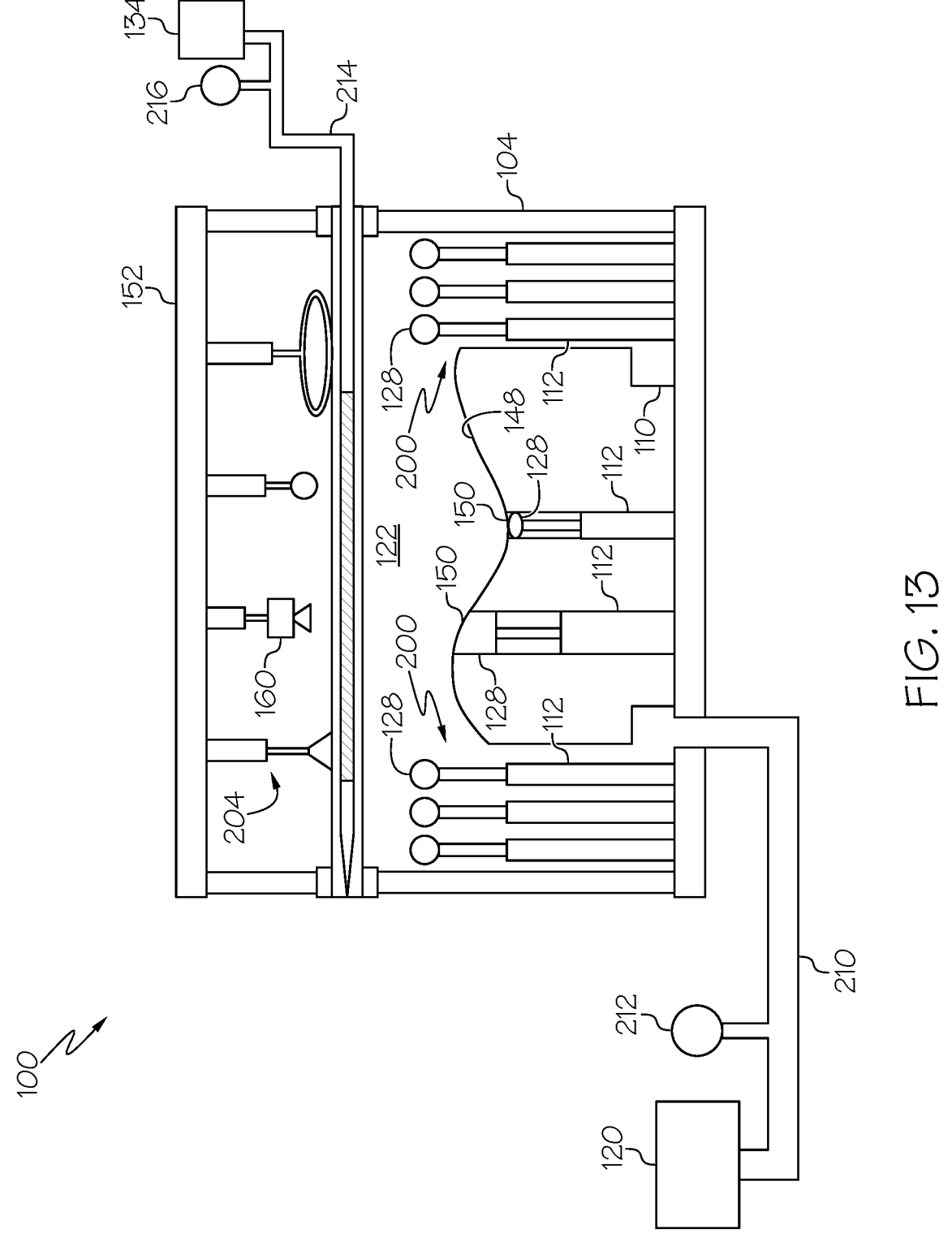
FIG. 13 is a schematic illustration of an example of the system.

Referring to FIGS. 12 and 13, in one or more examples, the support 128 includes the support surface 150. Selective extension of the actuator 112 places the support 128 in contact with the shaping assembly 114. With the actuator 112 in a fully retracted state, the support surface 150 and the tool surface 148 are continuous. For example, the shape, curvature, or profile contour of the support surface 150 is complementary to and extends continuously between directly adjacent and surrounding portions of the tool surface 148 of the forming tool 110 such that there is little to no gap between the tool surface 148 and the support surface 150. Hence, use of examples of the support 128 that is integrated into the forming tool 110 and having the support surface 150 enables selective control of a portion of the shaping assembly 114 directly over the tool surface 148 of the forming tool 110 and reduces or eliminates undesirable nonconformities in the workpiece 104 caused by gaps between the support surface 150 and the tool surface 148.

Referring to FIGS. 1 and 8-13, in one or more examples, the system 100 includes the cover 152 that is coupled to the housing 108 over the shaping assembly 114. Generally, the cover 152 is coupled to the housing 108 such that the shaping assembly 114 is between the cover 152 and the housing 108.

Figure 8:
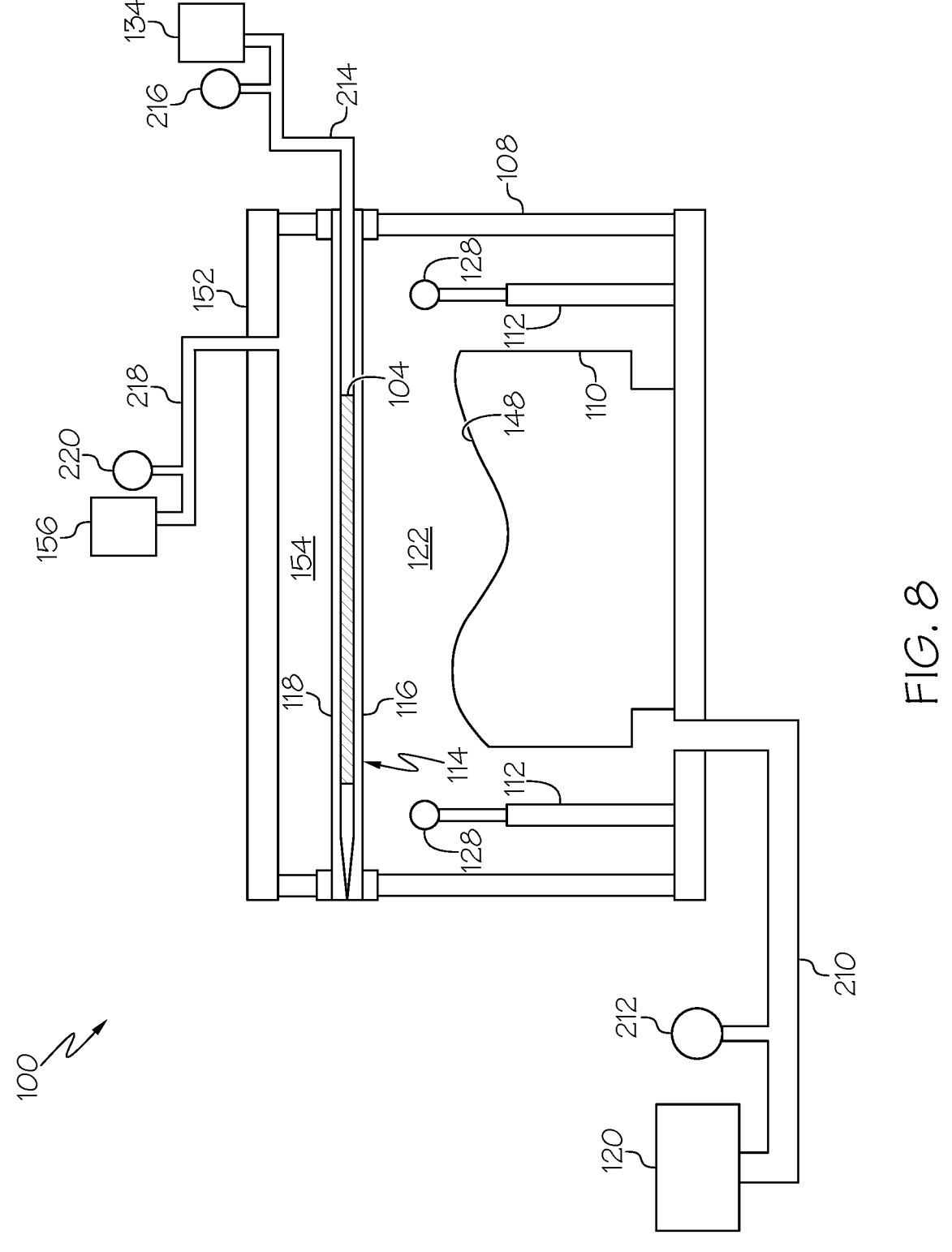
FIG. 8 is a schematic illustration of an example of the system.
Figure 9:
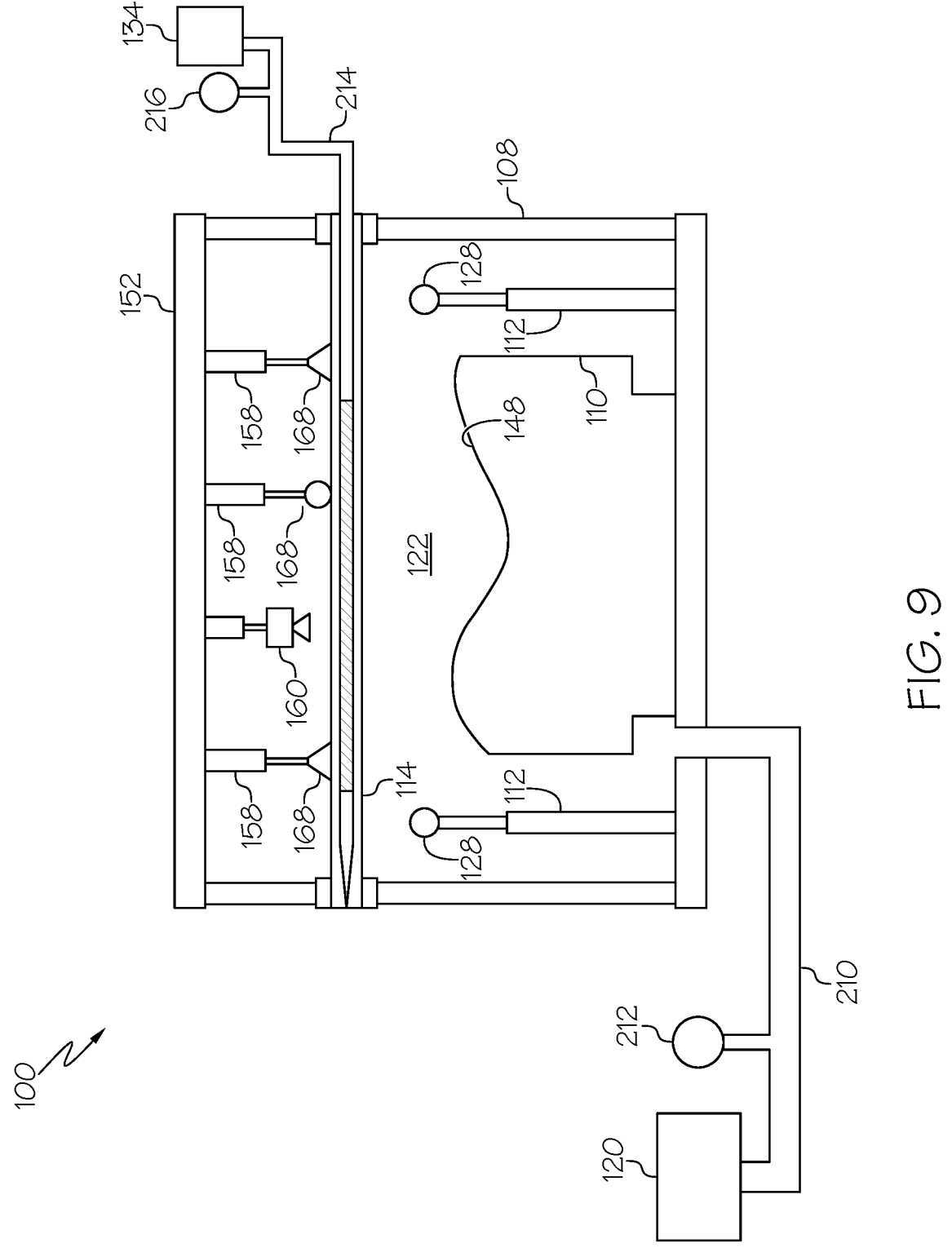
FIG. 9 is a schematic illustration of an example of the system.

Referring to FIGS. 1 and 8, in one or more examples, the cover 152 and the shaping assembly 114 form a second sealed vessel 154. The system 100 includes the positive pressure source 156 that creates a positive pressure between the cover 152 and the shaping assembly 114 to urge the shaping assembly 114 against the forming tool 110.

Referring to FIG. 8, in one or more examples, the positive pressure source 156 includes a pump. In these examples, the positive pressure source 156 increases the pressure in an upper portion of the housing 108 between the shaping assembly 114 and the cover 152, characterized as the second sealed vessel 154. In one or more examples, an aperture is located in the cover 152, which is in fluid and pressure communication with the positive pressure source 156 via a third conduit 218. In one or more examples, the system 100 also includes a third pressure gauge 220 in communication with the third conduit 218. The third pressure gauge 220 monitors the pressure in the third conduit 218 and, thus, within the second sealed vessel 154 (e.g., between the cover 152 and the shaping assembly 114). The positive pressure created between the cover 152 and the shaping assembly 114 forcibly contacts (e.g., pushes) the shaping assembly 114 against the forming tool 110.

Referring to FIGS. 1 and 9-13, in one or more examples, the system 100 includes the second actuator 158 that is positioned over the shaping assembly 114. The second actuator 158 selectively extends or retracts to further control the shape of at least the portion of the shaping assembly 114 while the shaping assembly 114 is urged against the forming tool 110. In one or more examples, the second actuator 158 is coupled to or otherwise hangs from the cover 152 over the shaping assembly 114. In one or more examples, the second actuator 158 assists with forming by pushing the shaping assembly 114 against the forming tool 110 along with the negative pressure created between the shaping assembly 114 and the housing 108. In one or more examples, the second actuator 158 is the primary driving force for pushing the shaping assembly 114 against the forming tool 110.

In one or more examples, the second actuator 158 extends or retracts as the shaping assembly 114 is forced into contact against the forming tool 110 to control the position of at least a portion of the shaping assembly 114. For example, the second actuator 158 translates (e.g., vertically as illustrated in FIGS. 9-13) as the shaping assembly 114 is pulled against the forming tool 110 by the negative pressure to control the position of at least a portion of the shaping assembly 114. In one or more examples, extension places an end of the second actuator 158 in contact with a surface (e.g., top surface) of the shaping assembly 114. Extension and/or retraction then maintains the end of the second actuator 158 in contact with the surface of the shaping assembly 114 as the shaping assembly 114 is urged toward and/or against the tool surface 148 of the forming tool 110. As such, in one or more examples, extension and/or retraction of the second actuator 158 acts with the direction of movement of the portion of the shaping assembly 114 toward the forming tool 110 and against the direction of movement of the actuator 112 and further controls the out-of-plane position of the portion of the shaping assembly 114 relative to at least another portion of the shaping assembly 114.

Referring generally to FIG. 1 and particularly to FIG. 10, in one or more examples, the second actuator 158 is movable relative to the shaping assembly 114. In one or more examples, the second actuator 158 selectively extends or retracts in a third direction 164. In one or more examples, the third direction 164 is at least approximately parallel to the out-of-plane direction of the shaping assembly 114. In the illustrated example, the third direction 164 is in the vertical direction. Hence, selective extension and retraction of the second actuator 158 moves and positions the end of the actuator 112 in the third direction 164 to assist oppose movement of at least a portion of the shaping assembly 114 toward the forming tool 110 in response to the negative pressure, to oppose the actuator 112, and to control the out-of-plane position of at least a portion of the shaping assembly 114 during the diaphragm forming process.

Referring generally to FIG. 1 and particularly to FIG. 10, in one or more examples, the second actuator 158 is movable in a fourth direction 166, which is at least approximately perpendicular to the third direction 164. In one or more examples, the fourth direction 166 is at least approximately parallel to the in-plane direction of the shaping assembly 114. In the illustrated example, the fourth direction 166 in the horizontal direction. Hence, selective movement of the second actuator 158 in the fourth direction 166 positions the second actuator 158 relative to the different portions of the shaping assembly 114 and relative to any other one of the plurality of second actuators 204.

Referring to FIG. 1, in one or more examples, the second actuator 158 includes one of a second electric cylinder 178, a second pneumatic cylinder 180, or a second hydraulic cylinder 182. In these examples, the stroke, the position, and/or the force of the second actuator 158 can be controlled by a programmable controller, such as the computer 188.

Referring to FIGS. 1 and 9-13, in one or more examples, the system 100 includes the press 168 that is coupled to the second actuator 158. Hence, selective extension and retraction of the second actuator 158 places the press 168 in contact with the shaping assembly 114. Further selective extension and/or retraction of the second actuator 158 maintains the press 168 in contact with the shaping assembly 114 during the diaphragm forming process.

Referring generally to FIG. 1 and particularly to FIG. 10, in one or more examples, the press 168 includes a second roller 170. Use of the second roller 170 as the press 168 enables selective control of a portion of the shaping assembly 114 in the out-of-plane direction while permitting free movement of the portion of the shaping assembly 114 in the in-plane direction relative to the second roller 170. Generally, the second roller 170 is free to rotate about at least one rotational axis that is generally perpendicular to the third direction 164 of movement of the second actuator 158. Examples of the second roller 170 include a cylindrical roller, a ball bearing, and the like.

Referring generally to FIG. 1 and particularly to FIG. 10, in one or more examples, the press 168 includes a second gripper 172. Use of the second gripper 172 as the press 168 enables selective control of a portion of the shaping assembly 114 in the out-of-plane direction and the in-plane direction by restricting movement of the portion of the shaping assembly 114 in the in-plane direction relative to the second gripper 172. In one or more examples, the second gripper 172 includes a second vacuum gripper 174. Other types of grippers, such as mechanical grippers, electrostatic grippers, and the like are also contemplated.

In one or more examples, in an extended position of the second actuator 158, the press 168 may hold a portion of the shaping assembly 114 against the tool surface 148 of the forming tool 110 while other portions of the shaping assembly 114 are urged against the forming tool 110 and/or positioned using the actuator 112.

Referring generally to FIG. 1 and particularly to FIG. 10, in one or more examples, the press 168 and or the support 128 includes an inflatable bladder 176. Use of the inflatable bladder 176 enables further control of portion of the shaping assembly 114 in the out-of-plane direction and, more particularly, enables the press 168 to selectively control the force applied to the shaping assembly 114 when pressing the shaping assembly 114 against the tool surface 148 of the forming tool 110.

In one or more examples, the support 128 (e.g., support surface 150) and/or the press 168 (e.g., press surface) can have any suitable profile shape, such as a shape that matches the shape or profile of the tool surface 148. In other examples, the support 128 (e.g., support surface 150) and/or the press 168 (e.g., press surface) is flexible or conformable surface (e.g., the support includes an inflatable bladder). In other examples, support 128 and/or the press 168 includes a shape memory material.

Referring to FIGS. 1 and 9-13, in one or more examples, the system 100 includes the sensor 160 that monitors the shape of at least the portion of the shaping assembly 114 while the shaping assembly 114 is urged against the forming tool 110. In one or more examples, the sensor 160 includes an image sensor 162. In one or more examples, the sensor 160 is movable relative to the shaping assembly 114. In one or more examples, the sensor 160 generates data that represents the real-time shape of the shaping assembly 114 and, thus, the workpiece 104, during the forming process. The data is transmitted to and analyzed by the computer 188. In one or more examples, the data is used by the computer 188 to generate movement command signals, which are transmitted to the actuator 112 and/or the second actuator 158.

In other examples, the sensor 160 includes one or more of a pressure sensor, a temperature sensor, an imaging sensor, and/or a photogrammetry sensor (e.g., a line scanning and/or methods that produce point cloud data). The sensor 160 is used to control the forming process directly to ensure the forming process stays as close as possible to the planned sequence, shape, etc. by adjusting the control (e.g., actuation and position) of the actuators 200 and the second actuators 204 and/or providing feedback for debugging the system.

Referring to FIGS. 1 and 4-13, in one or more examples, the system 100 includes the plurality of actuators 200 that is disposed in the housing 108 under the shaping assembly 114. In one or more examples, at least a portion of the actuators 200 are arranged around the forming tool 110. In one or more examples, at least one of the actuators 200 is integrated into the forming tool 110.

Referring to FIGS. 1 and 9-13, in one or more examples, the system 100 includes the plurality of second actuators 204 that is disposed over the shaping assembly 114.

Referring to FIGS. 1 and 3-13, in one or more examples, the system 100 includes the housing 108. The system 100 includes the forming tool 110 that is disposed in the housing 108. The system 100 includes the plurality of actuators 200 disposed in the housing 108. The system 100 includes the shaping assembly 114 that includes the lower diaphragm 116 and the upper diaphragm 118. The system 100 includes the negative pressure source 120 that is in fluid communication with the housing 108. The workpiece 104 is disposed between the lower diaphragm 116 and the upper diaphragm 118 of the shaping assembly 114 (e.g., as shown in FIGS. 3 and 4). The shaping assembly 114 is coupled to the housing 108 over the forming tool 110 such that the housing 108 and the shaping assembly 114 form a sealed vessel 122 around the forming tool 110. The negative pressure source 120 creates a negative pressure between the housing 108 and the shaping assembly 114 to urge the shaping assembly 114 against the forming tool 110. Each one of the actuators 200 selectively extends or retracts to control a shape of at least a portion of the shaping assembly 114 while the shaping assembly 114 is urged against the forming tool 110.

Referring to FIGS. 1 and 3-13, in one or more examples, at least one of the actuators 200 is movable relative to the housing 108 and the shaping assembly 114.

Referring to FIGS. 1 and 4-13, in one or more examples, the system 100 includes a plurality of supports 206. Each one of the supports 206 is coupled to one of the actuators 200. Selective extension and retraction of each one of the actuators 200 places a corresponding one of the supports 206 in contact with the shaping assembly 114.

Referring to FIGS. 1 and 4-13, in one or more examples, at least one of the supports 206 includes the roller 130.

Referring to FIGS. 1 and 4-13, in one or more examples, at least one of the supports 206 includes the gripper 132. In one or more examples, the gripper 132 includes the vacuum gripper 146.

Referring to FIGS. 1 and 13, in one or more examples, at least a portion of the actuators 200 is arranged in an array around the forming tool 110.

Referring to FIGS. 1 and 11-13, in one or more examples, at least one of the actuators 200 is integrated into the forming tool 110.

Referring to FIGS. 1 and 4-13, in one or more examples, the system 100 includes the support 128 that is coupled to the at least one of the actuators 200. The forming tool 110 includes the tool surface 148. The support 128 includes the support surface 150. Selective extension of the at least one of the actuators 200 places the support 128 in contact with the shaping assembly 114. With the at least one of the actuators 200 in a fully retracted state, the support surface 150 and the tool surface 148 are continuous.

Referring to FIGS. 1 and 8-13, in one or more examples, the system includes the cover 152 that is coupled to the housing 108 over the shaping assembly 114. In one or more examples, the cover 152 and the shaping assembly 114 form the second sealed vessel 154. The system 100 includes the positive pressure source 156 that creates a positive pressure between the cover 152 and the shaping assembly 114 to urge the shaping assembly 114 against the forming tool 110.

Referring to FIGS. 1 and 9-13, in one or more examples, the system 100 includes the plurality of second actuators 204 that is positioned over the shaping assembly 114. Each one of the second actuators 204 selectively extends or retracts to further control the shape of at least the portion of the shaping assembly 114 while the shaping assembly 114 is urged against the forming tool 110.

Referring to FIGS. 1 and 4-13, in one or more examples, at least one of the second actuators 204 is movable relative to the shaping assembly 114.

Referring to FIGS. 1 and 4-13, in one or more examples, the system 100 includes a plurality of presses 208. Each one of the presses 208 is coupled to one of the second actuators 204. Selective extension and retraction of each one of the second actuator 158 places a corresponding one of the presses 208 in contact with the shaping assembly 114. In one or more examples, the configuration or structural elements of the presses 208 and the supports 206 are the same. For example, the supports 206 and the presses 208 include combinations of grippers, rollers, inflatable bladders, contoured surfaces, flexible or conformable surfaces, and the like. In other words, whatever is below the shaping assembly 114 can also be above the shaping assembly.

Referring to FIGS. 1 and 4-13, in one or more examples, at least one of the presses 208 includes the second roller 170.

Referring to FIGS. 1 and 4-13, in one or more examples, at least one of the presses 208 includes the second gripper 172. In one or more examples, the second gripper 172 includes the second vacuum gripper 174.

Referring to FIGS. 1 and 4-13, in one or more examples, at least one of the presses 208 includes the inflatable bladder 176.

Referring to FIGS. 1 and 4-13, in one or more examples, the system 100 includes the sensor 160 that monitors the shape of at least the portion of the shaping assembly 114 while the shaping assembly 114 is urged against the forming tool 110.

Referring now to FIG. 2, the following are examples of the method 1000 for forming the workpiece 104, according to the present disclosure. In one or more examples, the method 1000 is implemented using the system 100 (FIG. 1). The method 1000 includes a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

Referring particularly to FIG. 1 and generally to FIG. 2, in one or more examples, one or more steps of the method 1000 is electronically controlled or computer controlled (e.g., under the direction of or by instructions from the computer 188). In these examples, the system 100 also includes the computer 188 that is adapted (e.g., configured or programmed) to instruct or direct one or more of the operational components of the system 100 to perform one or more of the operational steps implemented by the method 1000. As such, in one or more examples, the method 1000 is an electronically-controller method or a computer-implemented method.

Referring generally to FIGS. 1 and 3-13 and particularly to FIG. 2, in one or more examples, the method 1000 includes a step of (block 1008) forming the shaping assembly 114. The shaping assembly 114 includes the lower diaphragm 116, the upper diaphragm 118, and the workpiece 104 that is disposed between the lower diaphragm 116 and the upper diaphragm 118.

Referring generally to FIGS. 1 and 3-13 and particularly to FIG. 2, in one or more examples, the method 1000 includes a step of (block 1010) coupling the shaping assembly 114 to the housing 108 over the forming tool 110 such that the housing 108 and the shaping assembly 114 form the sealed vessel 122 around the forming tool 110.

Referring generally to FIGS. 1 and 3-13 and particularly to FIG. 2, in one or more examples, the method 1000 includes a step of (block 1018) creating a negative pressure between the housing 108 and the shaping assembly 114 to urge (e.g., pull) the shaping assembly 114 against the forming tool 110.

Referring generally to FIGS. 1 and 3-13 and particularly to FIG. 2, in one or more examples, the method 1000 includes a step of (block 1024) selectively extending or retracting the actuator 112 (one or more of the plurality of actuators 200), disposed within the housing 108 under the shaping assembly 114, to control a shape of at least a portion of the shaping assembly 114 while the shaping assembly 114 is urged against the forming tool 110.

Referring generally to FIGS. 1 and 3-13 and particularly to FIG. 2, in one or more examples, the method 1000 includes a step of (block 1004) creating a second negative pressure between the lower diaphragm 116 and the upper diaphragm 118 to urge the lower diaphragm 116 and the upper diaphragm 118 together around the workpiece 104.

Referring generally to FIGS. 1 and 3-13 and particularly to FIG. 2, in one or more examples, the method 1000 includes a step of (block 1022) moving the actuator 112 (one or more of the plurality of actuators 200) relative to the housing 108 and the shaping assembly 114.

Referring generally to FIGS. 1 and 3-13 and particularly to FIG. 2, in one or more examples, the method 1000 includes a step of (block 1026) placing the support 128, coupled the actuator 112 (one or more of the plurality of actuators 200), in contact with the shaping assembly 114, by selectively extending or retracting the actuator 112 (one or more of the plurality of actuators 200).

Referring generally to FIGS. 1 and 3-13 and particularly to FIG. 2, in one or more examples, the method 1000 includes a step of (block 1014) coupling the cover 152 to the housing 108 and a step of (block 1016) forming the second sealed vessel 154.

Referring generally to FIGS. 1 and 3-13 and particularly to FIG. 2, in one or more examples, the method 1000 includes a step of (block 1020) creating a positive pressure between the cover 152 and the shaping assembly 114 to urge the shaping assembly 114 against the forming tool 110.

Referring generally to FIGS. 1 and 3-13 and particularly to FIG. 2, in one or more examples, the method 1000 includes a step of (block 1030) selectively extending or retracting the second actuator 158 (one or more of the plurality of second actuators 204), disposed within the housing 108 over the shaping assembly 114, to control the shape of at least the portion of the shaping assembly 114 while the shaping assembly 114 is urged against the forming tool 110.

Referring generally to FIGS. 1 and 3-13 and particularly to FIG. 2, in one or more examples, the method 1000 includes a step of (block 1028) moving the second actuator 158 (one or more of the plurality of second actuators 204) relative to the shaping assembly 114.

Referring generally to FIGS. 1 and 3-13 and particularly to FIG. 2, in one or more examples, the method 1000 includes a step of (block 1032) placing the press 168, coupled the second actuator 158 (one or more of the plurality of second actuators 204), in contact with the shaping assembly 114, by selectively extending or retracting the second actuator 158 (one or more of the plurality of second actuators 204).

Referring generally to FIGS. 1 and 3-13 and particularly to FIG. 2, in one or more examples, the method 1000 includes a step of (block 1042) monitoring the shape of the shaping assembly 114.

Referring generally to FIGS. 1 and 3-13 and particularly to FIG. 2, in one or more examples, the method 1000 includes a step of (block 1002) disposing the workpiece 104 between the lower diaphragm 116 and the upper diaphragm 118 to form the shaping assembly 114.

Referring generally to FIGS. 1 and 3-13 and particularly to FIG. 2, in one or more examples, the method 1000 includes a step of (block 1012) forming the sealed vessel 122 around the forming tool 110 by the shaping assembly 114 and the housing 108.

Referring generally to FIGS. 1 and 3-13 and particularly to FIG. 2, in one or more examples, the method 1000 includes a step of (block 1034) urging the shaping assembly 114 against the forming tool 110.

Referring generally to FIGS. 1 and 3-13 and particularly to FIG. 2, in one or more examples, the method 1000 includes a step of (block 1038) controlling a shape of at least a portion of the shaping assembly 114 while the shaping assembly 114 is urged against the forming tool 110.

Referring generally to FIGS. 1 and 3-13 and particularly to FIG. 2, in one or more examples, the method 1000 includes a step of (block 1006) urging the lower diaphragm 116 and the upper diaphragm 118 against the workpiece 104.

Referring generally to FIGS. 1 and 3-13 and particularly to FIG. 2, in one or more examples, according to the method 1000, the step of (block 1034) urging the shaping assembly 114 against the forming tool 110 includes a step of (block 1036) applying a first shaping force 184 to a first portion of the shaping assembly 114. The step of (block 1038) controlling the shape of at least the portion of the shaping assembly 114 includes a step of (block 1040) applying a second shaping force 186, opposite the first shaping force 184, to a second portion of the shaping assembly 114.

Figure 14:
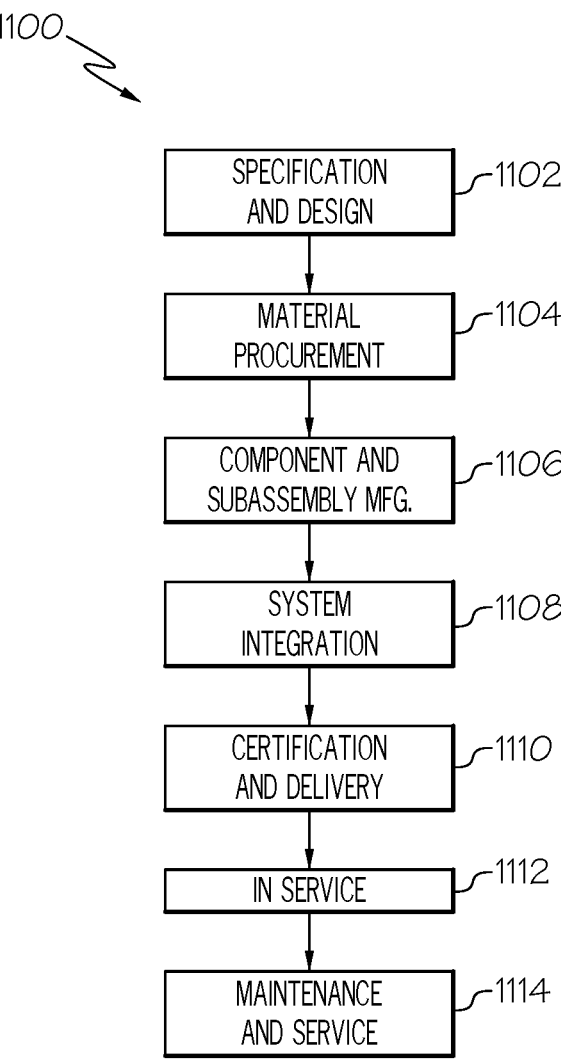
FIG. 14 is a flow diagram of an example of an aircraft manufacturing and service method.
Figure 15:
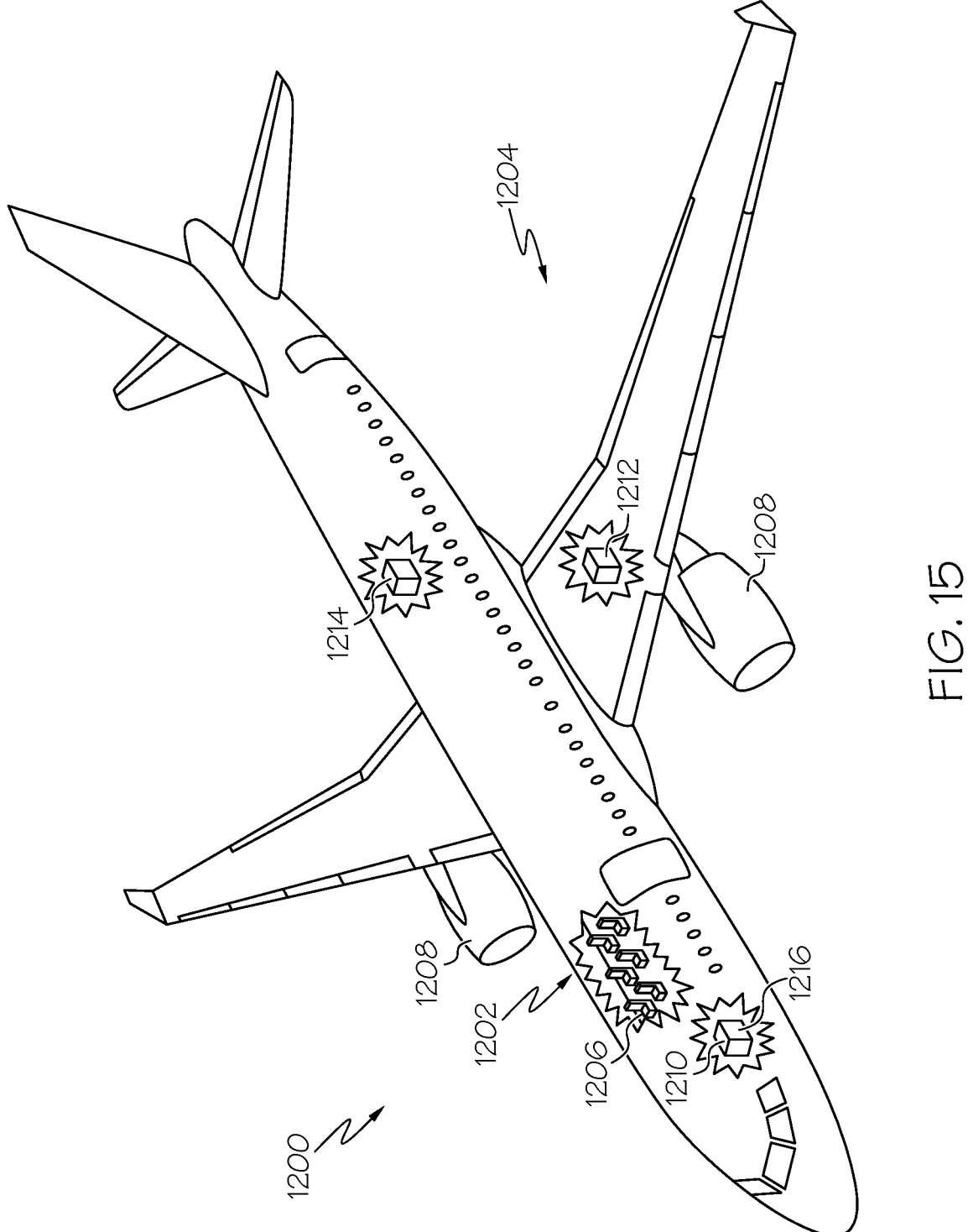
FIG. 15 is a schematic illustration of an example of an aircraft.

Referring now to FIGS. 14 and 15, examples of the system 100 and the method 1000 described herein, may be related to, or used in the context of, the aerospace manufacturing and service method 1100, as shown in the flow diagram of FIG. 14 and an aircraft 1200, as schematically illustrated in FIG. 15. As an example, the aircraft 1200 and/or the manufacturing and service method 1100 may include or utilize components that are manufactured of composite structures, which are shaped, formed, consolidated, co-consolidated, or otherwise manufactured using the system 100 and/or according to the method 1000.

Referring to FIG. 15, which illustrates an example of the aircraft 1200. The aircraft 1200 can be any aerospace vehicle or platform. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems 1216, such as, but not limited to, communications systems, avionics systems, software distribution systems, network communications systems, passenger information/entertainment systems, guidance systems, radar systems, weapons systems, and the like. The aircraft 1200 can have any number of components made of composite materials that are manufactured using system 100 and/or according to the method 1000.

Referring to FIG. 14, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 14 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the system 100 and the method 1000, shown and described herein, may be employed during any one or more of the stages of the manufacturing and service method 1100 shown in the flow diagram illustrated by FIG. 15. In an example, components of the aircraft 1200 can be manufactured of composite materials, which are shaped, formed, consolidated, or co-consolidated using the system 100 and/or according to the method 1000 during a portion of component and subassembly manufacturing (block 1106) and/or system integration (block 1108). Further, components of the aircraft 1200 can be manufactured of composite materials, which are shaped, formed, consolidated, or co-consolidated using the system 100 and/or according to the method 1000 while the aircraft 1200 is in service (block 1112). Also, components of the aircraft 1200 can be manufactured of composite materials, which are shaped, formed, consolidated, or co-consolidated using the system 100 and/or according to the method 1000 during system integration (block 1108) and certification and delivery (block 1110). Similarly, components of the aircraft 1200 can be manufactured of composite materials, which are shaped, formed, consolidated, or co-consolidated using the system 100 and/or according to the method 1000 while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1, 3-13 and 15, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1, 3-13 and 15, referred to above, need be included in every example and not all elements, features, and/or components described herein are necessarily depicted in each illustrative example. Accordingly, some of the elements, features, and/or components described and illustrated in FIGS. 1, 3-13 and 15 may be combined in various ways without the need to include other features described and illustrated in FIGS. 1, 3-13 and 15, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1, 3-13 and 15, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1, 3-13 and 15, and such elements, features, and/or components may not be discussed in detail herein with reference to each of FIGS. 1, 3-13 and 15. Similarly, all elements, features, and/or components may not be labeled in each of FIGS. 1, 3-13 and 15, but reference numerals associated therewith may be utilized herein for consistency.

In FIGS. 2 and 14, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 2 and 14 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100 and the method 1000 have been shown and described, modifications may occur to those skilled in the art upon reading the specification. The present application includes such modifications and is limited only by the scope of the claims.

What is claimed is:

1. A system for forming a workpiece comprising a composite material, the system comprising:
   a housing;
   a forming tool disposed in the housing;
   a shaping assembly comprising a lower diaphragm and an upper diaphragm;
   a negative pressure source in fluid communication with the housing;
   an actuator disposed in the housing; and
   a vacuum gripper coupled to the actuator,
   wherein:
      the workpiece is disposed between the lower diaphragm and the upper diaphragm of the shaping assembly;
      the shaping assembly is coupled to the housing over the forming tool such that the housing and the shaping assembly form a sealed vessel around the forming tool;
      the negative pressure source creates a negative pressure between the housing and the shaping assembly to urge the shaping assembly against the forming tool; and
      the actuator selectively extends or retracts to engage the vacuum gripper and control a shape of at least a portion of the shaping assembly while the shaping assembly is urged against the forming tool.

2. The system of claim 1, wherein:
   the actuator selectively extends or retracts in a first direction; and
   the actuator is movable in a second direction, which is at least approximately perpendicular to the first direction.

3. The system of claim 1, further comprising:
   a second actuator; and
   a support coupled to the second actuator,
   wherein selective extension and retraction of the actuator places the support in contact with the shaping assembly to further control the shape of at least the portion of the shaping assembly while the shaping assembly is urged against the forming tool.

4. The system of claim 3, wherein the support comprises a roller.

5. The system of claim 3, wherein the support comprises a gripper.

6. The system of claim 3,
   wherein:
      the forming tool comprises a tool surface;
      the support comprises a support surface;
      selective extension of the second actuator places the support in contact with the shaping assembly; and
      with the second actuator in a fully retracted state, the support surface and the tool surface are continuous.

7. The system of claim 3, wherein the second actuator is positioned above the shaping assembly.

8. The system of claim 7, wherein the support comprises a press.

9. The system of claim 3, wherein:
   the second actuator selectively extends or retracts in a third direction; and the second actuator is movable in a fourth direction, which is at least approximately perpendicular to the third direction.

10. The system of claim 1, wherein the actuator is integrated into the forming tool.

11. The system of claim 1, further comprising a cover coupled to the housing over the shaping assembly.

12. The system of claim 1, further comprising a sensor that monitors the shape of at least the portion of the shaping assembly while the shaping assembly is urged against the forming tool.

13. The system of claim 1, wherein the actuator is positioned below the shaping assembly.

14. A system for forming a workpiece comprising a composite material, the system comprising:

a housing;

a forming tool disposed in the housing;

a plurality of actuators disposed in the housing;

a shaping assembly comprising a lower diaphragm and an upper diaphragm;

a negative pressure source in fluid communication with the housing;

a vacuum gripper coupled to a first one of the actuators; and a support coupled to a second one of the actuators, wherein:

the workpiece is disposed between the lower diaphragm and the upper diaphragm of the shaping assembly;

the shaping assembly is coupled to the housing over the forming tool such that the housing and the shaping assembly form a sealed vessel around the forming tool;

the negative pressure source creates a negative pressure between the housing and the shaping assembly to urge the shaping assembly against the forming tool; and each one of the actuators selectively extends or retracts to engage an associated one of the vacuum gripper and the support and control a shape of at least a portion of the shaping assembly while the shaping assembly is urged against the forming tool.

15. The system of claim 14, wherein at least one of the actuators is integrated into the forming tool.

16. The system of claim 14, wherein:

the forming tool comprises a tool surface;

the support comprises a support surface;

selective extension of the second one of the actuators places the support in contact with the shaping assembly; and with the second one of the actuators in a fully retracted state, the support surface and the tool surface are continuous.

17. The system of claim 14, wherein at least one of the actuators is positioned below the shaping assembly and at least one of the actuators is positioned above the shaping assembly.

18. A method for forming a workpiece comprising a thermoformable material, the method comprising:

forming a shaping assembly comprising a lower diaphragm, an upper diaphragm, and the workpiece disposed between the lower diaphragm and the upper diaphragm;

coupling the shaping assembly is to a housing over a forming tool such that the housing and the shaping assembly form a sealed vessel around the forming tool;

creating a negative pressure between the housing and the shaping assembly to urge the shaping assembly against the forming tool; and selectively extending or retracting an actuator, disposed within the housing, to engage a vacuum gripper, coupled to the actuator, and control a shape of at least a portion of the shaping assembly while the shaping assembly is urged against the forming tool.

19. The method of claim 18, further comprising selectively extending or retracting a second actuator, disposed within the housing, to engage a support, coupled to the second actuator, and further control the shape of at least the portion of the shaping assembly while the shaping assembly is urged against the forming tool.

20. The method of claim 18, further comprising monitoring the shape of the shaping assembly.

* * * * *